US012696086B2

(12) United States Patent
Kim et al.

(10) Patent No.: US 12,696,086 B2
(45) Date of Patent: Jul. 28, 2026

(54) ELECTRONIC DEVICE, AND METHOD BY WHICH ELECTRONIC DEVICE PERFORMS CLOUD ONBOARDING OF EXTERNAL ELECTRONIC DEVICE

(71) Applicant: Samsung Electronics Co., Ltd., Suwon-si (KR)

(72) Inventors: Hakkwan Kim, Suwon-si (KR); Buseop Jung, Suwon-si (KR); Beomjip Kim, Suwon-si (KR); Hyejung Bang, Suwon-si (KR); Dooho Lee, Suwon-si (KR); Sunkey Lee, Suwon-si (KR); Soonho Lee, Suwon-si (KR); Wonjun Jang, Suwon-si (KR); Namju Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 18/486,587

(22) Filed: Oct. 13, 2023

(65) Prior Publication Data

US 2024/0056808 A1 Feb. 15, 2024

Related U.S. Application Data

(63) Continuation of application No. PCT/KR2022/005354, filed on Apr. 13, 2022.

(30) Foreign Application Priority Data

Apr. 15, 2021 (KR) ........................ 10-2021-0049227

(51) Int. Cl.
*H04W 12/06* (2021.01)

(52) U.S. Cl.
CPC ................................. *H04W 12/06* (2013.01)

(58) Field of Classification Search
CPC ..................................................... H04W 12/06
See application file for complete search history.

(56) References Cited

U.S. PATENT DOCUMENTS 10,169,587 B1 1/2019 Nix
10,547,613 B1 * 1/2020 Roths ..................... H04L 9/0844
(Continued)

FOREIGN PATENT DOCUMENTS

KR 10-2019-0001138 A 1/2019
KR 10-2019-0068549 A 6/2019
(Continued)

OTHER PUBLICATIONS

International Search Report dated Jul. 14, 2023, issued in International Patent Application No. PCT/KR2022/005354.
(Continued)

*Primary Examiner* — Myron Wyche
(74) *Attorney, Agent, or Firm* — Jefferson IP Law, LLP

(57) ABSTRACT

An electronic device is provided. The electronic device includes a communication circuit and at least one processor, wherein the at least one processor can be configured to acquire identification information about an external electronic device from same, transmit, to a server by means of the communication circuit, an authentication information request message including the identification information about the external electronic device, receive, from the server by means of the communication circuit, authentication information required for authenticating the external electronic device so that the external electronic device is registered in a cloud, and transmit, to the external electronic device by means of the communication circuit, a message including the authentication information required for authenticating the external electronic device.

15 Claims, 11 Drawing Sheets

(56)         References Cited

U.S. PATENT DOCUMENTS

| | | | |
|---|---|---|---|
| 2015/0229475 | A1 | 8/2015 | Benoit et al. |
| 2016/0036819 | A1 | 2/2016 | Zehavi et al. |
| 2016/0308861 | A1 | 10/2016 | Ameling et al. |
| 2017/0195318 | A1 | 7/2017 | Liu et al. |
| 2018/0109381 | A1 | 4/2018 | Cammarota et al. |
| 2018/0109418 | A1 | 4/2018 | Cammarota et al. |
| 2018/0316673 | A1 | 11/2018 | Shah et al. |
| 2019/0268338 | A1 | 8/2019 | Patil et al. |
| 2019/0334892 | A1 | 10/2019 | Goto |
| 2020/0162474 | A1 | 5/2020 | Zou et al. |
| 2020/0221296 | A1 | 7/2020 | Jiang et al. |
| 2020/0226258 | A1* | 7/2020 | Nix .................... H04L 63/0838 |
| 2021/0385778 | A1 | 12/2021 | Ahn et al. |

FOREIGN PATENT DOCUMENTS

| | | | |
|---|---|---|---|
| KR | 10-2019-0124141 | A | 11/2019 |
| WO | 2020-043730 | A1 | 3/2020 |
| WO | 2020-080850 | A1 | 4/2020 |
| WO | 2020-168207 | A1 | 8/2020 |

OTHER PUBLICATIONS

Extended European Search Report dated Jul. 15, 2024, issued in European Patent Application No. 22788439.2.
Korean Office Action dated Jan. 20, 2026, issued in Korean Application No. 10-2021-0049227.

* cited by examiner

ELECTRONIC DEVICE, AND METHOD BY WHICH ELECTRONIC DEVICE PERFORMS CLOUD ONBOARDING OF EXTERNAL ELECTRONIC DEVICE

CROSS-REFERENCE TO RELATED APPLICATION(S)

This application is a continuation application, claiming priority under § 365 (c), of an International application No. PCT/KR2022/005354, filed on Apr. 13, 2022, which is based on and claims the benefit of a Korean patent application number 10-2021-0049227, filed on Apr. 15, 2021, in the Korean Intellectual Property Office, the disclosure of which is incorporated by reference herein in its entirety.

BACKGROUND

1. Field

The disclosure relates to an electronic device and a method of performing cloud onboarding of an external electronic device in the electronic device.

2. Description of Related Art

Wireless communication systems have been developed extensively to provide various types of communication services, such as voice or data. Typically, a wireless communication system is a multiple access system that supports communication with multiple electronic devices by sharing available system resources (e.g., time resources, frequency resources, bandwidth resources, or output power resources). Multiple access systems may include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Along with the recent advances in information and communication technology, various wireless communication technologies have been developed. In particular, wireless local area network (WLAN) is a technology that allows an electronic device such as a smartphone, a personal digital assistant (PDA), or a laptop computer to wirelessly access the Internet from a home, business, or specific service coverage area, based on a radio frequency technology.

In order to achieve flexibility in communication between devices in a WLAN system, various protocols have been proposed for direct communication between devices without the intervention of a management entity such as a base station (BS) or an access point (AP).

The above information is presented as background information only to assist with an understanding of the disclosure. No determination has been made, and no assertion is made, as to whether any of the above might be applicable as prior art with regard to the disclosure.

SUMMARY

The wireless fidelity alliance (WFA) is working on the development of a device provisioning protocol (DPP) that allows a wireless-fidelity (Wi-Fi) device without a user interface (UI) or with a limited UI to connect to a Wi-Fi network in a simple and efficient way based on the Wi-Fi specification. Meanwhile, an Internet of things (IoT) device may register to a cloud server by using server information, an authentication code, or access token information received from a mediator and receive available services through a cloud.

Aspects of the disclosure are to address at least the above-mentioned problems and/or disadvantages and to provide at least the advantages described below. Accordingly, an aspect of the disclosure is to provide an electronic device which, when connecting to a Wi-Fi network and registering a device to a cloud server, registers the electronic device to the cloud server simultaneously with a DPP process, and a method of performing cloud onboarding of an external electronic device in the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit and at least one processor. The at least one processor is configured to obtain identification information about an external electronic device from the external electronic device, transmit an authentication information request message including the identification information about the external electronic device to a server through the communication circuit, receive authentication information required for authenticating the external electronic device, for onboarding of register the external electronic device to a cloud, from the server through the communication circuit, and transmit a provisioning configuration response message including the authentication information required for authenticating the external electronic device to the external electronic device through the communication circuit.

In accordance with another aspect of the disclosure, an electronic device is provided. The electronic device includes a communication circuit and at least one processor. The at least one processor is configured to provide identification information about the electronic device to an external electronic device, transmit a provisioning configuration request message for provisioning between the electronic device and the external electronic device to the external electronic device through the communication circuit, and receive a provisioning configuration response message including authentication information required for authenticating the electronic device, for onboarding of the electronic device to a cloud, from the external electronic device through the communication circuit.

In accordance with another aspect of the disclosure, a method performed by an electronic device is provided. The method includes obtaining identification information about an external electronic device from the external electronic device, transmitting an authentication information request message including the identification information about the external electronic device to a server, receiving authentication information required for authenticating the external electronic device, for onboarding of the external electronic device to a cloud, from the server, and transmitting a provisioning configuration response message including the authentication information required for authenticating the external electronic device to the external electronic device.

In accordance with another aspect of the disclosure, a method performed by an electronic device is provided. The method includes providing identification information about the electronic device to an external electronic device, transmitting a provisioning configuration request message for provisioning between the electronic device and the external electronic device to the external electronic device, and receiving a provisioning configuration response message including authentication information required for authenticating the electronic device, for onboarding of the electronic device to a cloud, from the external electronic device.

Various embodiments of the disclosure may support cloud onboarding of an electronic device through a device provisioning protocol (DPP) without an additional procedure.

Various embodiments of the disclosure may trigger a service required by an electronic device by using an extended DPP connector without an additional procedure, after a DPP process.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
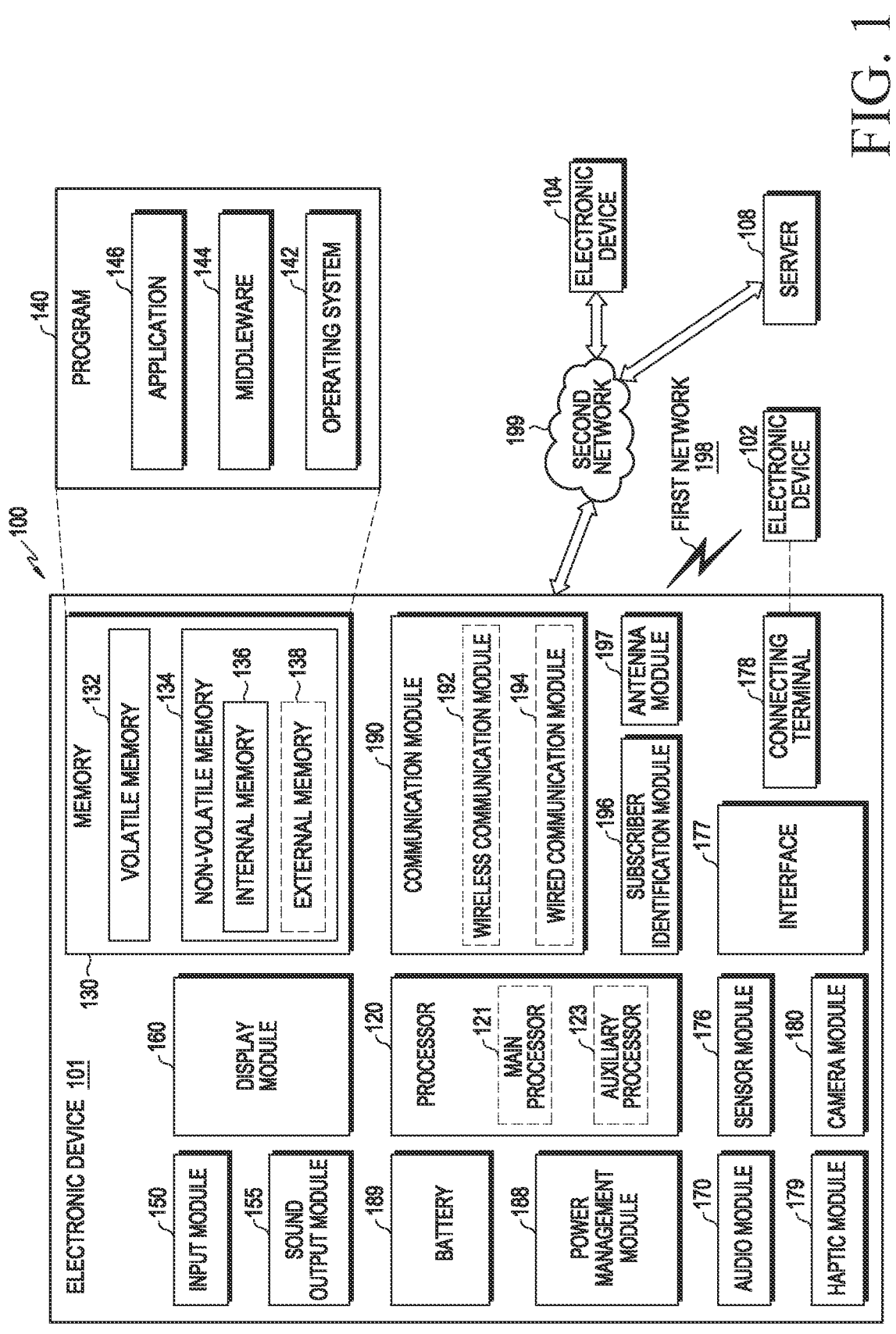
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions or and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, when the technical terms used in the disclosure are incorrect ones that do not accurately express the spirit of the disclosure, they should be understood by being replaced with technical terms that can be correctly understood by those skilled in the art. In addition, the general terms used in the disclosure should be interpreted as defined in dictionaries or according to the context, and should not be interpreted as excessively narrow meanings.

In this application, the term "have" or "include" should not be interpreted as necessarily including multiple components or operations described in the specification, and should be interpreted as excluding some of the components or operations or further including additional components or operations.

Further, the terms including first or second as used in the disclosure may be used to describe various components, and the components should not be limited by the terms. The terms are used only for the purpose of distinguishing one component from another. For example, a first component may be called a second component, and vice versa without departing from the scope of the disclosure.

When it is said that a component is "connected to" or "coupled to" another component, the component may be connected or coupled to the other component directly or with a third component in between. On the other hand, when it is said that a component is "directly connected to" or "directly coupled to" another component, it should be understood that there is no third component in between.

Further, it should be noted that the attached drawings are presented merely to help understanding of the spirit of the disclosure, and should not be construed as limiting the spirit of the disclosure. The spirit of the disclosure should be interpreted as encompassing all modifications, equivalents, and alternatives in addition to the attached drawings.

Hereinafter, a terminal will be described in various embodiments of the disclosure. A terminal may be referred to as an electronic device, a mobile station, a mobile equipment (ME), a user equipment (UE), a user terminal (UT), a subscriber station (SS), a wireless device, a handheld device, and an access terminal (AT). Alternatively, in various embodiments of the disclosure, a terminal may be a device having a communication function, such as a mobile phone, a personal digital assistant (PDA), a smartphone, a wireless modem, and a laptop computer.

Further, reference will be made to standards provided by wireless access standardization organizations, the Institute of Electrical and Electronics Engineers (IEEE) and the Wi-Fi alliance (WFA) in describing various embodiments of the disclosure in detail. However, the subject matter of the disclosure is also applicable to other communication systems having a similar technical background by making a slight modification without greatly departing from the scope of the disclosure, as judged by those skilled in the art.

FIG. 1 is a block diagram illustrating an electronic device in a network environment according to an embodiment of the disclosure.

Referring to FIG. 1, an electronic device 101 in an network environment 100 may communicate with an electronic device 102 through a first network 198 (e.g., a short-range wireless communication network), or an electronic device 104 or a server 108 through a second network 199 (e.g., a long-range wireless communication network). According to an embodiment, the electronic device 101 may communicate with the electronic device 104 through the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to yet another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to a further embodiment, the auxiliary processor 123 (e.g., an image signal processor or a communication processor) may be implemented as part of another component (e.g., the camera module 180 or the communication module 190) functionally related to the auxiliary processor 123. According to still another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or through a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to yet another embodiment, the audio module 170 may obtain the sound through the input module 150, or output the sound through the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to a further embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to still another embodiment, the interface 177 may include, for example, a high definition multimedia interface (HDMI), a universal serial bus (USB) interface, a secure digital (SD) card interface, or an audio interface.

A connecting terminal 178 may include a connector through which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user through his tactile sensation or kinesthetic sensation. According to another embodiment, the haptic module 179 may include, for example, a motor, a piezoelectric element, or an electric stimulator.

The camera module 180 may capture a still image or moving images. According to yet another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to a further embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to still another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device through the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device through the selected at least one antenna. According to a further embodiment, another component (e.g., a radio frequency integrated circuit (RFIC)) other than the radiating element may be additionally formed as part of the antenna module 197.

According to various embodiments, the antenna module 197 may form an mmWave antenna module. According to still another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween through an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 through the server 108 coupled with the second network 199. Each of the electronic device 102 or the electronic device 104 may be a device of a same type as, or a different type, from the electronic device 101. According to another embodiment, all or some of operations to be executed at the electronic device 101 may be executed at one or more of the external electronic devices 102 or 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to a further embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or through a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to still another embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online through an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The WFA has proposed a device provisioning protocol (DPP) based on Wi-Fi technology, and the DPP may connect a Wi-Fi device without a user interface (UI) or with a limited UI to a Wi-Fi network in a simple and efficient way.

Figure 2:
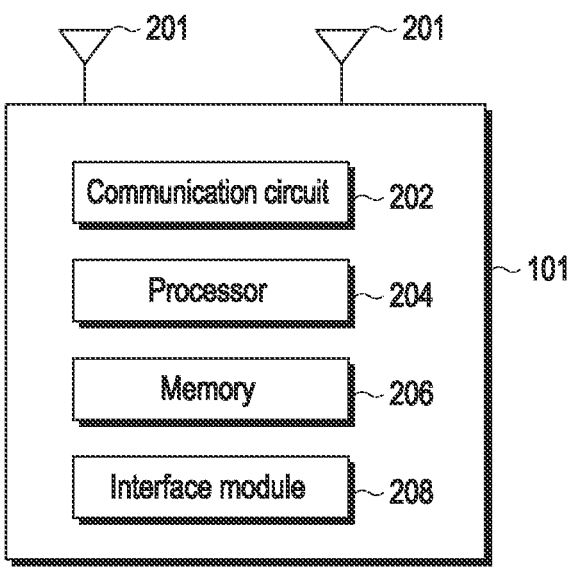
FIG. 2 is a block diagram illustrating an electronic device according to an embodiment of the disclosure.

FIG. 2 is a block diagram illustrating the electronic device according to an embodiment of the disclosure.

Referring to FIG. 2, an electronic device (e.g., the electronic device 101 of FIG. 1) may be a device that implements the DPP. Hereinafter, a device implementing the DPP will be referred to as a DPP device, for ease of description.

The electronic device 101 may include a communication circuit 202 (e.g., the communication module 190 of FIG. 1) that transmits and receives signals to and from an external electronic device (e.g., the electronic device 102 or 104 of FIG. 1), such as a peer device, using one or more antennas 201.

The electronic device 101 may include at least one processor 204 (e.g., the processor 120 of FIG. 1) which may be implemented as one or more single-core processors or one or more multi-core processors, and memory 206 (e.g., the memory 130 of FIG. 1) which stores instructions for operating the electronic device 101.

The electronic device 101 may include an interface module 208 (e.g., the interface 177 of FIG. 1) that provides a wired and/or wireless interface for communicating with components outside a network. At least some of the one or more antennas 201, the communication circuit 202, or the interface module 208 may be implemented as at least a part of the communication module 190 and the antenna module 197 of FIG. 1. Although the one or more antennas 201 are shown in FIG. 2 as disposed outside of the electronic device 101, this is for illustrative purposes only, and those skilled in the art will readily understand that the one or more antennas 201 may be located inside a housing forming the exterior of the electronic device 101 and/or in at least a part of the housing, which may apply to other drawings as well.

According to another embodiment of the disclosure, the electronic device 101 may include the communication circuit 202 and at least one processor 204. The at least one processor 204 may obtain identification information about an external electronic device from the external electronic device, and transmit an authentication information request message including the identification information about the external electronic device to a server (e.g., a cloud server or an authentication server) through the communication circuit 202. The at least one processor 204 may receive authentication information required to authenticate the external electronic device, for cloud onboarding of the external electronic device, from the server through the communication circuit 202. The cloud onboarding may mean registering the electronic device to a cloud. The at least one processor 204 may be configured to transmit a provisioning configuration response message including the authentication information required to authenticate the external electronic device to the external electronic device through the communication circuit 202.

According to yet another embodiment of the disclosure, the at least one processor 204 may obtain the identification information about the external electronic device from the external electronic device in any one of a quick response (QR) code scheme, Bluetooth communication, a Bluetooth low energy (BLE) scheme, a near field communication (NFC) scheme, and a public key exchange (PKEX) scheme. The identification information about the external electronic device may include at least one of a device identifier (ID) or serial information of the external electronic device.

According to a further embodiment of the disclosure, the authentication information required to authenticate the external electronic device may include at least one of an authentication code, an access token, a refresh token, or a server address.

According to still another embodiment of the disclosure, the at least one processor 204 may transmit a provisioning authentication request message for provisioning authentication between the electronic device 101 and the external electronic device to the external electronic device through the communication circuit 202. The at least one processor 204 may receive a provisioning authentication response message corresponding to the provisioning authentication request message from the external electronic device through the communication circuit 202. The at least one processor 204 may be configured to receive a provisioning configuration request message for provisioning configuration between the electronic device and the external electronic device from the external electronic device through the communication circuit 202.

According to an embodiment of the disclosure, the at least one processor 204 may obtain first service information configured by the external electronic device from the external electronic device. The provisioning configuration response message may be configured to further include second service information configured by the electronic device based on the first service information.

According to another embodiment of the disclosure, the electronic device 101 may include the communication circuit 202 and the at least one processor 204. The at least one processor 204 may be configured to provide identification information about the electronic device 101 to an external electronic device, transmit a provisioning configuration request message for provisioning configuration between the electronic device 101 and the external electronic device to the external electronic device through the communication circuit 202, and receive a provisioning configuration response message including authentication information required to authenticate the electronic device 101, for cloud onboarding of the electronic device 101, from the external electronic device through the communication circuit 202.

According to another embodiment of the disclosure, the at least one processor 204 may provide the identification information about the electronic device 101 to the external electronic device in any one of a QR code scheme, Bluetooth communication, a BLE scheme, an NFC scheme, and a PKEX scheme.

According to another embodiment of the disclosure, the authentication information required to authenticate the electronic device 101 may include at least one of an authentication code, an access token, a refresh token, or a server address.

According to another embodiment of the disclosure, the at least one processor 204 may be configured to receive a provisioning authentication request message for provisioning authentication between the electronic device 101 and the external electronic device from the external electronic device through the communication circuit 202, and transmit a provisioning authentication response message corresponding to the provisioning authentication request message to the external electronic device through the communication circuit 202.

According to another embodiment of the disclosure, the at least one processor 204 may provide first service information configured by the electronic device to the external electronic device. The provisioning configuration response message may be configured to further include second service information configured by the external electronic device based on the first service information.

The DPP proposed by the WFA will be described below in detail.

In another embodiment, providing a process of connecting a Wi-Fi device to a network in a simple and secure way may be essential for the continuous growth and expansion of the Wi-Fi technology. For example, providing a process of connecting a Wi-Fi device to a network in a simple and secure way may be more essential in markets such as smart home or IoT where there are many Wi-Fi devices without a UI or with a limited UI.

In order to configure a network connection of a Wi-Fi device, the Wi-Fi device may be provided with network information and a secure credential. In yet another embodiment of the disclosure, the secure credential may be information required to join a peer-to-peer (P2P) group as defined by the Wi-Fi simple configuration specification. An operation of adding a Wi-Fi device without a UI or with a limited UI to a network may be cumbersome and performed in different manners by different manufacturers of Wi-Fi devices.

There is a need for a Wi-Fi device configuration scheme that enables a Wi-Fi device to connect to a Wi-Fi network in a simple and efficient way. For this purpose, the DPP proposed by the WFA may connect a Wi-Fi device without a UI or with a limited UI to a Wi-Fi network in a simple and efficient way.

According to various embodiments, the DPP may simplify the configuration of a Wi-Fi device based on a standardized mechanism and allow the Wi-Fi device to connect directly to a Wi-Fi network in a relatively easy manner, for example, by scanning a product QR code with a smartphone. In a further embodiment, the DPP may, for example, simplify network setup and client device provisioning, while providing an improved user experience, enhanced security, and/or support of IoT device provisioning.

According to various embodiments, in the DPP, a network manager may use a trusted device such as a smartphone to set up an access point (AP) and manage network access for other client devices such as other client Wi-Fi devices, for example, in a network such as a home or an office. For example, the DPP may maintain a secure network connection by using a strong password principle, while supporting a smooth user experience.

Figure 3:
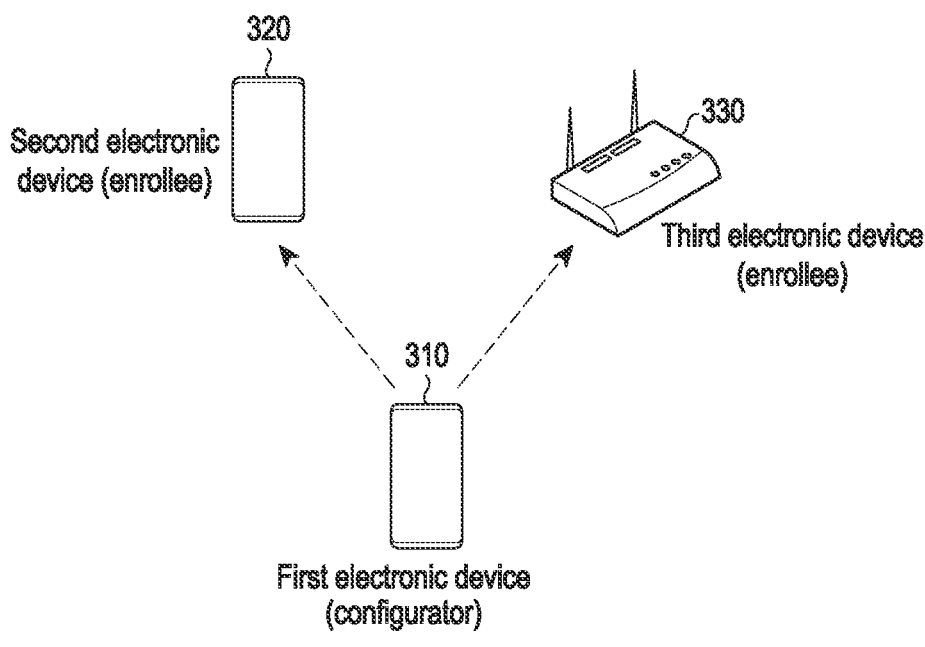
FIG. 3 is a block diagram illustrating an architecture of a device provisioning protocol (DPP) network according to an embodiment of the disclosure.

FIG. 3 is a diagram illustrating an DPP network architecture according to an embodiment of the disclosure.

In an embodiment, the DPP network architecture illustrated in FIG. 3 may be an architecture based on Wi-Fi provisioning roles Referring to FIG. 3, a DPP network may include a plurality of electronic devices, such as an electronic device (e.g., a first electronic device 310) and external electronic devices (e.g., a second electronic device 320 and a third electronic device 330). In another embodiment, each of the first electronic device 310, the second electronic device 320, and the third electronic device 330 may be a DPP device.

The DPP architecture defines device roles during DPP bootstrapping, DPP authentication, DPP provisioning (or configuration), and DPP connectivity (or introduction), and the device roles may include two types, for example, configurator and enrollee, or initiator and responder. In FIG. 3, the first electronic device 310 may operate as a configurator, and each of the second electronic device 320 and the third electronic device 330 may operate as an enrollee.

In the DPP network, a configurator may be a logical entity that has the capabilities of registering and provisioning devices, for device-to-device (D2D) communication or infrastructure communication.

In the DPP network, an initiator represents a DPP device that initiates a DPP authentication protocol, and either a configurator or an enrollee may be an initiator. In yet another embodiment, a responder represents a DPP device that responds to initiation of the DPP authentication protocol by an initiator, and may be either a configurator or an enrollee.

The configurator may support setup of an enrollee, and the configurator and the enrollee may be involved in DPP bootstrapping, DPP authentication, and DPP configuration. The configurator or the enrollee may operate as an initiator in DPP bootstrapping and DPP authentication. DPP configuration and DPP introduction may be initiated by the enrollee.

In a further embodiment of the disclosure, a configurator and an enrollee will be described below in detail.

First, a configurator will be described.

In a DPP network, a specific DPP device such as a main DPP device may be designated as a configurator. The configurator is a centralized configuration point, which may provision all DPP devices including APs in the DPP network. Any one of various DPP devices included in the DPP network may be a configurator.

Secondly, an enrollee will be described.

In still another embodiment, an enrollee is a DPP device that a network manager of the DPP network wants to connect to the DPP network. A DPP device added to the DPP network, such as an AP, a smart appliance, a computer, a printer, or a television, may be an enrollee, and any DPP device capable of implementing Wi-Fi functionality except for the configurator may be an enrollee.

Figure 4:
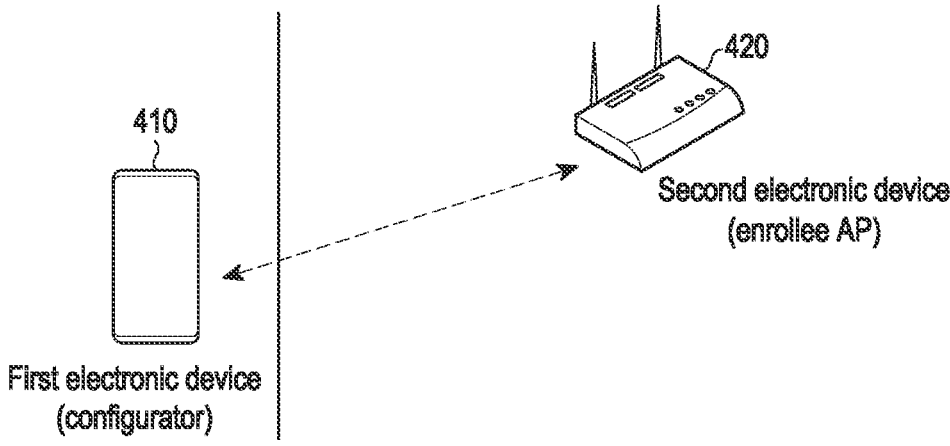
FIG. 4 is a diagram illustrating an operation of establishing a network in a DPP network according to an embodiment of the disclosure.

FIG. 4 is a diagram illustrating an operation of establishing a network in a DPP network according to an embodiment of the disclosure.

Referring to FIG. 4, the DPP network may include a plurality of electronic devices, such as an electronic device (e.g., a first electronic device 410) and an external electronic device (e.g., a second electronic device 420). In FIG. 4, each of the first electronic device 410 and the second electronic device 420 may be a DPP device, and it is assumed that the first electronic device 410 operates as a configurator and the second electronic device 420 operates as an enrollee AP.

In an embodiment, the first electronic device 410 may provision an enrollee, which is the second electronic device 420, for example, an initial AP 420 based on the DPP. The first electronic device 410 may provision enrollee clients (not shown separately in FIG. 4) which are other enrollees, and allow the enrollees to discover, select, and connect to the DPP network.

As illustrated in FIG. 4, a network manager of the DPP network may configure the first electronic device 410, which is a mobile device, as a configurator, and then configure an enrollee AP, for example, the second electronic device 420 through the first electronic device 410. This AP configuration operation may be performed prior to a network connection, and a DPP network may be established through the AP configuration operation.

Figure 5:
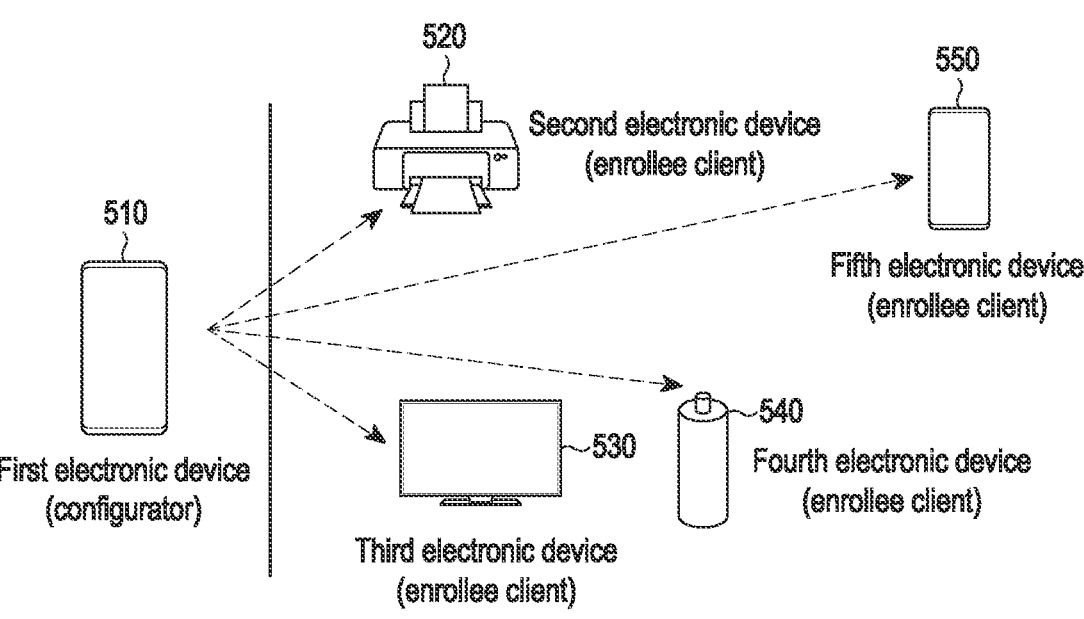
FIG. 5 is a diagram illustrating a registration operation in a DPP network according to an embodiment of the disclosure.

FIG. 5 is a diagram illustrating a registration operation in a DPP network according to an embodiment of the disclosure.

Referring to FIG. 5, after a DPP network is established, a manager of the DPP network may initiate a registration process to register DPP devices. In an embodiment, the DPP network may include a plurality of electronic devices, such as an electronic device (e.g., a first electronic device 510) and external electronic devices (e.g., a second electronic device 520, a third electronic device 530, a fourth electronic device 540, or a fifth electronic device 550). In FIG. 5, it is assumed that the first electronic device 510 operates as a configurator, and each of the second electronic device 520, the third electronic device 530, the fourth electronic device 540, and the fifth electronic device 550 operates as an enrollee client.

At least one of the second electronic device 520, the third electronic device 530, the fourth electronic device 540, or the fifth electronic device 550 may obtain a configuration for connecting to the DPP network based on information provisioned by the first electronic device 510. The first electronic device 510 may generate an individual secure credential with the external electronic device, and the external electronic device may establish a connection to the DPP network, using the secure credential. In another embodiment, the secure credential may be information required to join a P2P group.

Figure 6:
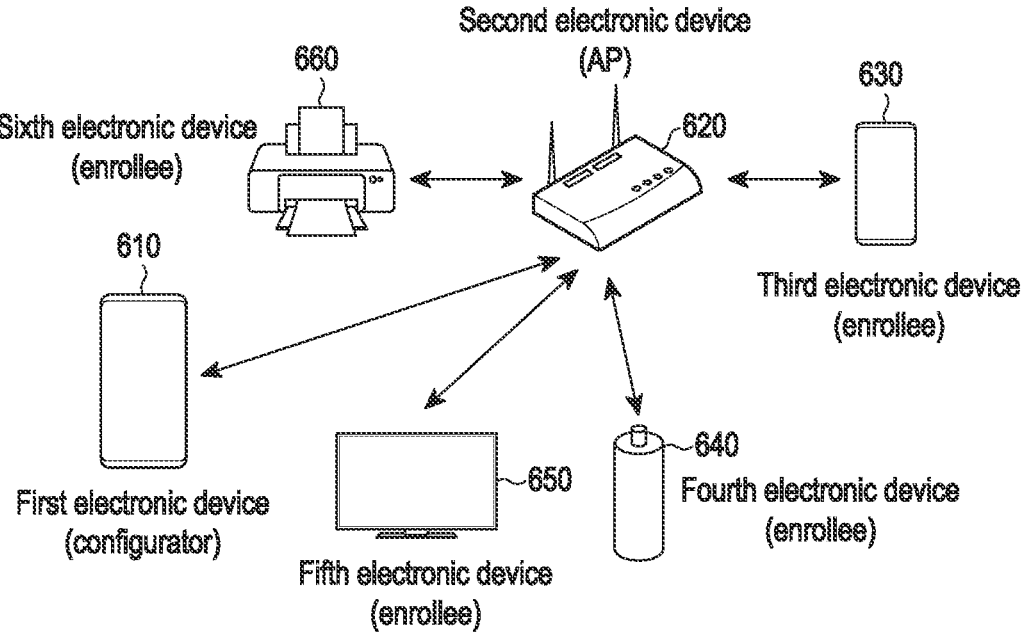
FIG. 6 is a diagram illustrating a network connection operation in a DPP network according to an embodiment of the disclosure.

FIG. 6 is a diagram illustrating a network connection operation in a DPP network according to an embodiment of the disclosure.

Referring to FIG. 6, after DPP devices are registered to a DPP network, a corresponding enrollee client may discover the DPP network through a second electronic device 620 (e.g., an AP) and connect to the discovered DPP network based on a configuration for connecting to the DPP network obtained in a registration process. In an embodiment, the DPP network may include a plurality of electronic devices, such as an electronic device (e.g., a first electronic device 610) and external electronic devices (e.g., a second electronic device 620, a third electronic device 630, a fourth electronic device 640, a fifth electronic device 650, and a sixth electronic device 660). In FIG. 6, for ease of description, it is assumed that the first electronic device 610 operates as a configurator, the second electronic device 620 operates as an AP, and each of the third electronic device 630, the fourth electronic device 640, the fifth electronic device 650, and the sixth electronic device 660 operates as an enrollee.

In another embodiment, the second electronic device 620, which is an AP, may be connected to the first electronic device 610, which is a configurator, and at least one of the third electronic device 630, the fourth electronic device 640, the fifth electronic device 650, or the sixth electronic device 660, which are enrollees, may discover the DPP network through the second electronic device 620 and connect to the discovered DPP network.

According to various embodiments, Wi-Fi Easy Connect may be provided by the WFA standard to make an operation of adding a Wi-Fi device to a Wi-Fi network much simpler and more efficient. Wi-Fi Easy Connect supports a bootstrapping mechanism, which is a mechanism for safely adding a configurator and an enrollee to a Wi-Fi network, while minimizing user actions per Wi-Fi device. Wi-Fi Easy Connect may use an enrollee QR code to support the bootstrapping mechanism.

In yet another embodiment, the QR code may include various types of information, such as a secure key, a unique ID of the Wi-Fi device, and so on. The QR code may be recognized by a Wi-Fi device equipped with a QR code scanning function, and avoid the need for a user to manually enter information to authenticate the Wi-Fi device. Further, the QR code may avoid issues that may arise due to data entry errors.

Wi-Fi Easy Connect is a protocol that allows Wi-Fi devices to connect to a Wi-Fi network in a simple and efficient way, and refers to a protocol such as the DPP. Wi-Fi Easy Connect may be used as a marketing term in place of the DPP.

A provisioning operation using a QR code and a configurator in a Wi-Fi Easy Connect network will be described below.

(1) The QR code of an enrollee may be scanned by using a camera equipped in a configurator. The QR code may be provided in the form of a sticker or a card.

(2) The configurator may read the QR code, automatically search for a secure Wi-Fi communication link with the enrollee by decoding the QR code, and establish a secure Wi-Fi communication link with the enrollee based on a search result.

(3) The configurator may configure Wi-Fi network information for the enrollee by using a secure channel.

(4) Upon completion of the configuration of Wi-Fi network information for the enrollee, the enrollee may discover a Wi-Fi network without user intervention by using the Wi-Fi network information provided by the configurator, select a specific Wi-Fi network based on a discovery result, and perform a connection operation with the selected Wi-Fi network.

In the Wi-Fi Easy Connect network, when the configurator is not equipped with a function of recognizing a QR code, or when the enrollee is not equipped with a function of displaying a QR code, it may be possible to establish a Wi-Fi communication link between the configurator and the enrollee by manually entering a string by the user.

The Wi-Fi Easy Connect technology may be designed to be flexible enough to provision Wi-Fi devices in various manners and support of initiation of a provisioning operation at a configurator or an enrollee. As noted from the provisioning operation as described above, a Wi-Fi device operating as a configurator, for example, a smartphone may scan the QR code of a Wi-Fi device operating as an enrollee, for example, an IoT device, and include the QR code of the IoT device in Wi-Fi network information to be provisioned.

According to various embodiments, the configurator may provide the QR code of the enrollee, for provisioning a Wi-Fi configuration. In a hotel's Wi-Fi network, for example, a configurator may provide a QR code to an enrollee, for example, a hotel room television (TV). A customer may scan the QR code provided through the hotel room TV by using a smartphone which will perform a provisioning operation, and accordingly, the provisioning operation may be performed as described above. For example, the customer's smartphone may be on-boarded to the hotel's Wi-Fi network.

In a further embodiment, the proposed provisioning process of the DPP may include four operations, such as a DPP bootstrapping operation, a DPP authentication operation, a DPP configuration operation, and a DPP access operation. In still another embodiment, the DPP access operation may also be referred to as a peer discovery operation.

In an embodiment, one electronic device may operate as a configurator and an external electronic device may operate as an enrollee in three operations: the DPP bootstrapping operation, the DPP authentication operation, and the DPP configuration operation. In another embodiment, the configurator may perform an operation of configuring electronic devices to connect to a DPP network as described above.

In yet another embodiment, an enrollee AP may perform an operation of providing network access as described above. In a further embodiment, the enrollee may be an enrollee client or an AP, and when network configuration is completed, the enrollee may be connected to the AP and access the network, or may operate as an AP and provide network access.

The DPP bootstrapping operation, the DPP authentication operation, the DPP configuration operation, and the DPP access operation will be described below.

First, the DPP bootstrapping operation will be described. According to still another embodiment, in the DPP bootstrapping operation, DPP devices may exchange public bootstrapping keys to establish a secure provisioning connection. In an embodiment, the public bootstrapping keys may be security information used in the DPP bootstrapping operation.

More specifically, a DPP device is assigned an ID, and the ID assigned to the DPP device may include a QR code or a user-readable string (printed or digital) in the form of a public key and a private key. In the DPP bootstrapping operation, a configurator and an enrollee may establish a trusted relationship to perform mutual authentication and establish a secure connection based on a mutual authentication result.

In another embodiment, public bootstrapping keys are exchanged in the DPP bootstrapping operation, as described above, and the public bootstrapping keys may be transmitted in only one direction or exchanged in both directions, depending on whether mutual authentication between the configurator and the enrollee is required. In the DPP bootstrapping operation, the public bootstrapping keys may be exchanged based on various schemes such as a QR code scheme, a Bluetooth scheme, a BLE scheme, an NFC scheme, a PKEX scheme, and a cloud scheme.

After the public bootstrapping keys are exchanged, a connection may be established between the configurator and the enrollee. In yet another embodiment, the public bootstrapping keys may be different from a secure credential received by the enrollee in the DPP configuration operation following the DPP bootstrapping operation. In a further embodiment, bootstrapping information may be used in the DPP authentication operation and the DPP configuration operation after the DPP bootstrapping operation, and include a small list of global operating classes/channel pairs and a medium access control (MAC) address. In still another embodiment, the small list of global operating classes/channel pairs may ideally include only one channel.

Secondly, the DPP authentication operation and the DPP configuration operation will be described.

According to an embodiment, the DPP devices establish a trusted and secure channel by using the bootstrapping keys of the DPP in the DPP authentication operation, and the configurator may provision the enrollee through the secure channel established during the DPP authentication operation by executing a DPP configuration protocol in the DPP configuration operation.

According to another embodiment, upon completion of the DPP bootstrapping operation, the configurator and the enrollee may establish a secure Wi-Fi connection by using the DPP authentication protocol. The configurator, which is an initiator in the DPP authentication operation and the DPP configuration operation, may request authentication from the enrollee, which is a responder, based on channel information obtained through the DPP bootstrapping operation. In yet another embodiment, the configurator may request authentication by transmitting a DPP authentication request frame to the responder. In a further embodiment, the DPP authentication request frame may include a hash of a responder public bootstrapping key, a hash of an initiator public bootstrapping key, an initiator public protocol key, or at least one of an initiator nonce attribute or initiator capabilities attribute encrypted with a first intermediate key. In still another embodiment, the hash of the responder public bootstrapping key, the hash of the initiator public bootstrapping key, the initiator public protocol key, or the at least one of the initiator nonce attribute or initiator capabilities attribute encrypted with the first intermediate key, included in the DPP authentication request frame may be security information used in the DPP authentication operation.

In an embodiment, the enrollee may respond to the authentication request from the configurator, while waiting on the channel based on the channel information obtained through the DPP bootstrapping operation. For example, the enrollee may respond to the authentication request by transmitting a DPP authentication response frame to the configurator. In another embodiment, the DPP authentication response frame may include the hash of the responder public bootstrapping key, the hash of the initiator public bootstrapping key, a responder public protocol key, or at least one of a responder nonce attribute, responder capabilities attribute, or initiator capabilities attribute encrypted with a second intermediate key. In yet another embodiment, the hash of the responder public bootstrapping key, the hash of the initiator public bootstrapping key, the responder public protocol key, or the at least one of the responder nonce attribute, responder capabilities attribute, or initiator capabilities attribute encrypted with the second intermediate key, included in the DPP authentication response frame may be security information used in the DPP authentication operation.

Upon completion of the DPP authentication operation, a secure connection may be established between the configurator and the enrollee, and after the secure connection is established, the enrollee may initiate a transaction to obtain network configuration information from the configurator. For example, the responder may transmit a DPP configuration request frame to the configurator, and the configurator may transmit a DDP configuration response frame to the responder in response to the DDP configuration request frame. The responder may verify the obtained secure credential and network information through a DPP configuration protocol and transmit a verification result to the configurator. Upon completion of the DPP configuration operation, the enrollee may operate as an AP or may discover a target AP and securely connect to the discovered target AP.

In a further embodiment, encoded configuration information transmitted and received in the DPP configuration operation may include a DPP configuration object, and the DPP configuration object may include the following DPP configuration object parameters, and may be a javascript object notation (JSON) encoded data structure. In still another embodiment, the DPP configuration object may be referred to as network configuration information.

(1) Wi-Fi Technology Object.

A Wi-Fi technology object may identify the Wi-Fi technology of a policy to be provisioned, and indicate a connection type such as AP infrastructure connection. In an embodiment, the enrollee may set the value of a Wi-Fi technology object included in the DDP configuration request frame to a value that indicates a Wi-Fi technology to be provisioned, and the configurator may set the value of a Wi-Fi technology object included in the DPP configuration response frame to a value that indicates a Wi-Fi technology to be used in operations between the enrollee and the configurator. In another embodiment, the Wi-Fi technology object may indicate a Wi-Fi technology to be used in the DPP authentication operation and the DPP configuration operation.

(2) DPP Discovery Object.

A DPP discovery object may include operational or discovery information, such as, a service set identifier (SSID), an operating channel, or an operating band.

(3) Credential Object.

A credential object may include credential information provisioned by the enrollee to obtain secure network access. The credential information may be dependent on the value of an authentication and key management (AKM) type parameter included in the DPP configuration object.

In the DPP configuration operation, network configuration information, for example, a DPP configuration object, which includes secure credential information and network information such as an SSID, may be transmitted from the configurator to the enrollee. In yet another embodiment, the secure credential information may include a connector, which is credential information provisioned by the enrollee. The connector may be used for a pair of enrollees to establish a security association by a DPP network introduction protocol.

In a further embodiment, a connector is a credential signed by the configurator, and may be used for an enrollee client to connect to an enrollee AP. In still another embodiment, the configurator possesses a signing key pair, for example, a c-sign-key and a C-sign-key, where the c-sign-key is used by the configurator to sign connectors, and the C-sign-key is used for a provisioned DPP device to verify the connector of another DPP device signed by the same configurator.

The connector of each enrollee may include a public key, a network role, and group attribute information, and may be signed by the configurator. The public key may provide the ID of the enrollee. The network role may indicate whether the enrollee is to be registered as an enrollee client (or enrollee station (STA)) or an enrollee AP. The group attribute information may be used to detect whether the enrollee is capable of establishing a network connection. A connector signature may prove that the contents of the connector were created by the configurator. Because the connector includes a public key rather than a password, the secure credential information may be different for each Wi-Fi device, that is, each enrollee. That is, other enrollees may not access the network by using the connector, and when the enrollee corresponding to that connector belongs to a particular AP, other Aps may not impersonate the AP.

In an embodiment, the enrollee client may discover an enrollee AP based on the network information. The enrollee client may perform an authentication operation based on the connector and establish a network connection based on a network introduction (NI) protocol. An advantage of using a connector may lie in that each enrollee connected to an AP has unique secure credential information.

Figure 7:
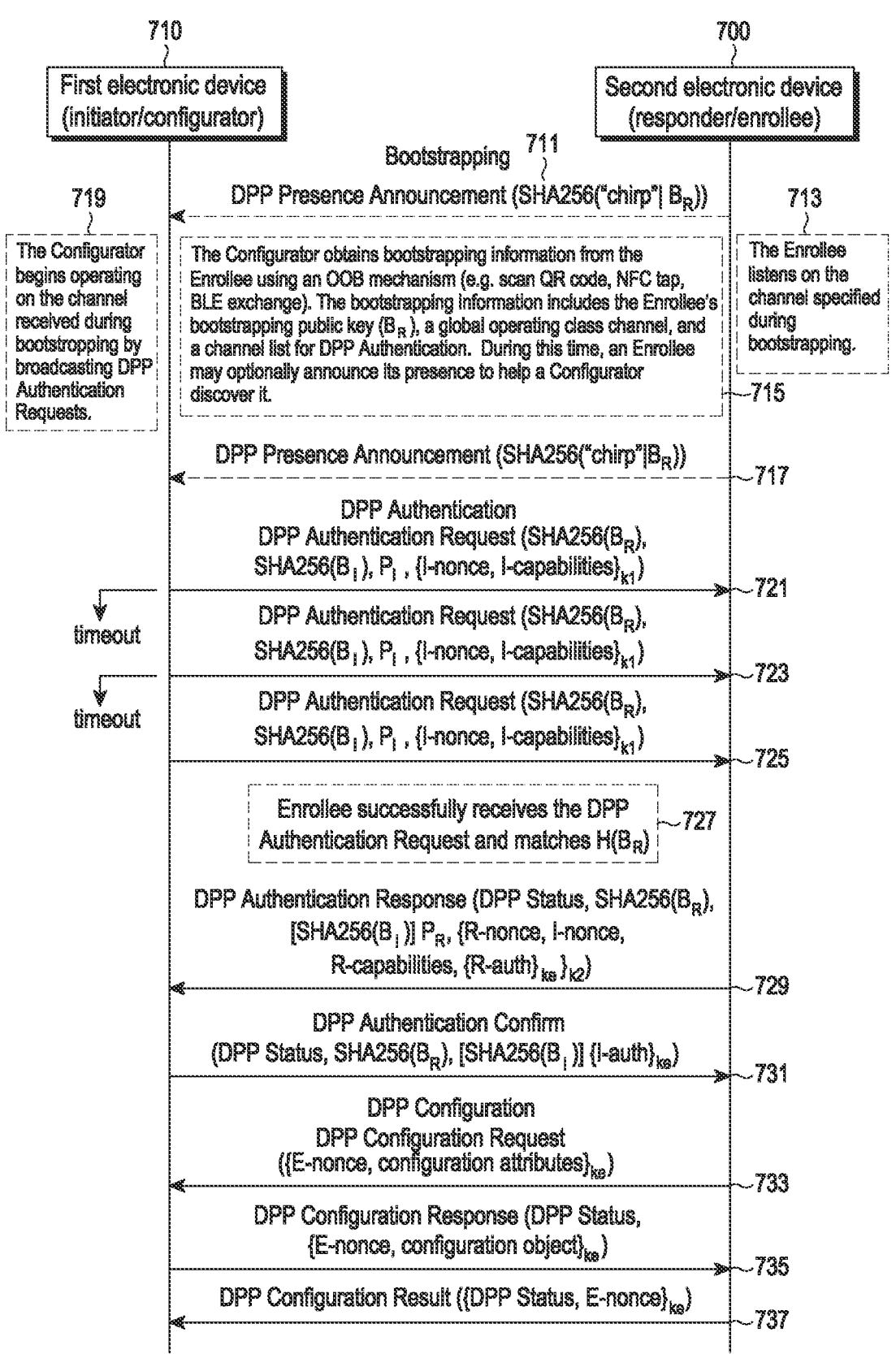
FIG. 7 is a diagram illustrating a provisioning process in a DPP network according to an embodiment of the disclosure.

FIG. 7 is a diagram illustrating a provisioning process in a DPP network according to an embodiment of the disclosure.

Referring to FIG. 7, an electronic device, for example, a first electronic device 710 and an external electronic device, for example, a second electronic device 700 may each be a DPP device, with the first electronic device 710 operating as a configurator and an initiator and the second electronic device 700 operating as an enrollee and a responder.

In operation 711, the second electronic device 700 operating as an enrollee and a responder may transmit a DPP presence announcement frame. In another embodiment, the DPP presence announcement frame may be used for the responder to signal to the initiator, which is a configurator, that the responder is ready to participate in a DPP exchange, and include a hash that includes a public bootstrapping key of the transmitter, for example, the responder. In yet another embodiment, the hash including the public bootstrapping key of the responder may be security information used in a DPP bootstrapping operation. In a further embodiment, the hash for the DPP presence announcement frame to prevent leakage of the hash of a public key of a non-provisioned device may be SHA256 ("chirp"|$B_R$). In still another embodiment, $B_R$ may represent the public bootstrapping key of the responder, for example, the second electronic device 700.

In operation 713, the second electronic device 700 may listen on a specified channel during the DPP bootstrapping operation. The first electronic device 710 operating as a configurator and initiator may obtain bootstrapping information from the second electronic device 700 by an out-of-band (OOB) mechanism, such as QR code scan, NFC tap, or BLE exchange. In an embodiment, the bootstrapping information may include the public bootstrapping key $B_R$ of the second electronic device 700, a global operating class channel, and/or a channel list, for DPP authentication. During the DPP bootstrapping operation, the second electronic device 700 may optionally announce its presence to assist the first electronic device 710 in discovering the second electronic device 700 in operation 715. In operation 717, the second electronic device 700 may transmit the DPP presence announcement frame.

In operation 719, the first electronic device 710 may begin to operate on a channel based on channel information received during bootstrapping by broadcasting DPP authentication request frames. For example, the first electronic device 710 may broadcast the DPP authentication request frames continuously in operations 721, 723, and 725.

In another embodiment, the DPP authentication request frames may include SHA256($B_R$), SHA256($B_I$), $P_I$, and {I-nonce, I-capabilities}$_{k1}$. For example, SHA256($B_R$) may represent the SHA256 hash of $B_R$, $B_I$ may represent the public bootstrapping key of the first electronic device 710, SHA256($B_I$) may represent the SHA256 hash of $B_I$, $P_I$ may represent the public protocol key of the first electronic device 710, I-nonce may represent an initiator nonce attribute, I-capabilities may represent an initiator capabilities attribute, and k1 may represent a first intermediate key. In yet another embodiment, {I-nonce, I-capabilities} may represent I-nonce and I-capabilities encrypted with k1. In a further embodiment, at least one of SHA256($B_R$), SHA256 ($B_I$), $P_I$, or {I-nonce, I-capabilities}$_{k1}$ included in the DPP authentication request frames may be security information used in a DPP authentication operation.

In operation 727, the first electronic device 710 may broadcast DPP authentication request frames, and when the second electronic device 700 successfully receives a DPP authentication request frame, it may match it with a hash function value H($B_R$) of $B_R$.

In operation 729, the second electronic device 700 may transmit a DPP authentication response frame to the first electronic device 710 in response to the DPP authentication request frame. In still another embodiment, the DPP authentication response frame may include a DPP status field, SHA256($B_R$), [SHA256($B_I$)], $P_R$, and (R-nonce, I-nonce, R-capabilities, {R-auth}$_{ke}$}$_{k2}$. For example, $P_R$ may represent the public protocol key of the second electronic device, R-nonce may represent a responder nonce attribute, R-capabilities may represent a responder capabilities attribute, K2 may represent a second intermediate key, and [ ] may represent an optional value. For example, [SHA256($B_I$)] may be included in the DPP authentication response frame, when a specific condition is satisfied or optionally. In an embodiment, {R-nonce, I-nonce, R-capabilities, {R-auth}$_{ke}$}$_{k2}$ may represent R-nonce, I-nonce, R-capabilities, and {R-auth}$_{ke}$ which are encrypted with k2. R-auth may represent an authenticating tag of the second electronic device 700, and ke may represent an encryption key. In another embodiment, {R-auth}$_{ke}$ may represent R-auth encrypted with ke. In yet another embodiment, {I-nonce, I-capabilities} may represent I-nonce and I-capabilities which are encrypted with k1. In a further embodiment, at least one of SHA256($B_R$), [SHA256($B_R$)], $P_R$, or {R-nonce, I-nonce, R-capabilities, {R-auth}$_{ke}$}$_{k2}$ may be security information used in the DPP authentication operation.

In operation 731, upon receipt of the DPP authentication response frame from the second electronic device 700, the first electronic device 710 may transmit a DPP authentication confirm frame to the second electronic device 700. In still another embodiment, the DPP authentication confirm frame may include a DPP status field, SHA256($B_R$), [SHA256($B_I$)], and {I-auth}$_{ke}$. In an embodiment, I-auth may represent an authenticating tag of the first electronic device 710, and ke may represent an encryption key. In another embodiment, {I-auth}$_{ke}$ may represent I-auth encrypted with ke.

In operation 733, upon receipt of the DPP authentication confirm frame from the first electronic device 710, the second electronic device 700 may transmit a DPP configuration request frame to the first electronic device 710. In yet another embodiment, the DPP configuration request frame may include {E-nonce, configuration object}$_{ke}$. In a further embodiment, E-nonce may represent an E-nonce attribute, and configuration object may represent a DPP configuration request object attribute. In still another embodiment, {E-nonce, configRequest}$_{ke}$ may represent E-nonce and a configuration object which are encrypted with ke.

In operation 735, upon receipt of the DPP configuration request frame, the first electronic device 710 may transmit a DPP configuration response frame to the second electronic device 700 in response to the DPP configuration request frame. In an embodiment, the DPP configuration response frame may include a DPP status field, and {E-nonce, configuration object}$_{ke}$. In another embodiment, configuration object may represent a DPP configuration object. In yet another embodiment, {E-nonce, configuration object}$_{ke}$ may represent E-nonce and a configuration object which are encrypted with ke.

In operation 737, upon receipt of the DPP configuration response frame, the second electronic device 700 may transmit a DPP configuration result frame to the first electronic device 710. In a further embodiment, the DPP configuration result frame may include {DPP Status, E-nonce}$_{ke}$. In still another embodiment, {DPP Status, E-nonce}$_{ke}$ may represent DPP Status and E-nonce which are encrypted with ke.

Thirdly, the DPP access operation in the provisioning process will be described.

In an embodiment, an NI protocol is used to allow an enrollee client to securely connect to an enrollee AP by using a connector provided by the configurator, and the DPP access operation based on the NI protocol is performed as follows.

(1) Each of an enrollee client and an enrollee AP may verify whether its connector has been signed by the configurator.

(2) Each enrollee client may identify that its role is compatible and establish communication with the enrollee AP.

(3) Enrollee clients may verify whether group attributes match.

(4) Each of the enrollee AP and the enrollee clients may derive a pairwise master key (PMK) based on a public connector key.

(5) Based on the derived PMK, connections may be established between the enrollee AP and the enrollee clients.

Figure 8:
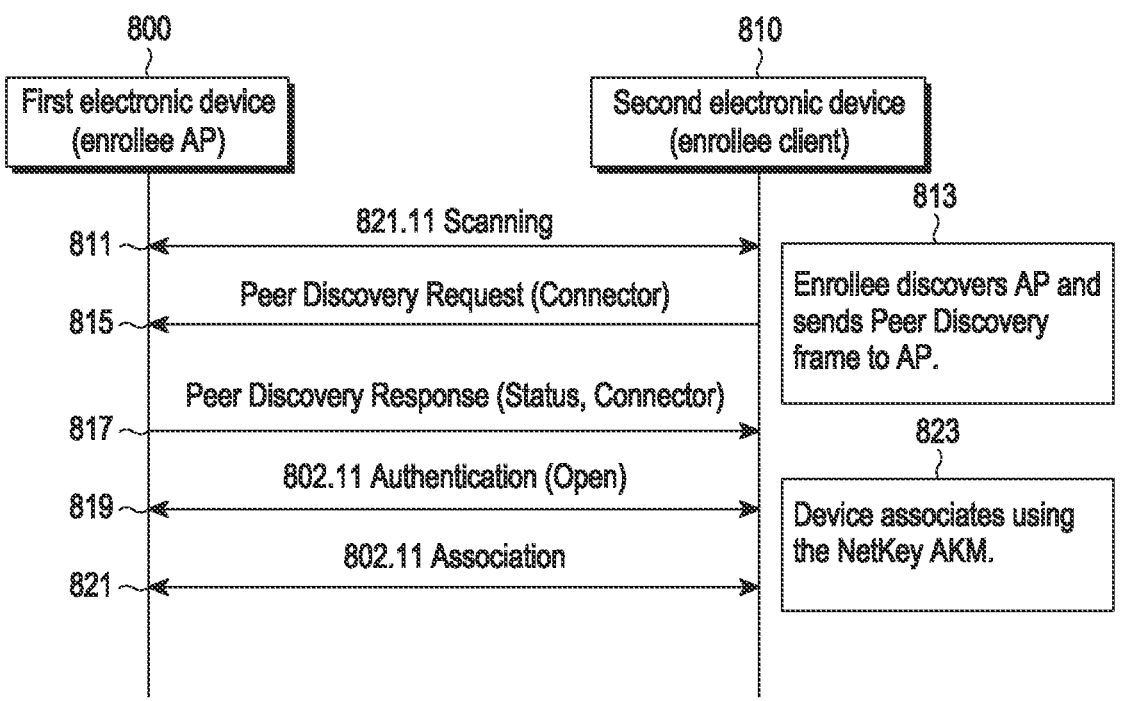
FIG. 8 is a diagram illustrating a signal flow for a network access operation using a connector according to an embodiment of the disclosure.

FIG. 8 is a diagram illustrating a signal flow for a network access operation using a connector according to an embodiment of the disclosure.

Referring to FIG. 8, an electronic device, for example, a first electronic device 800 and an external electronic device, for example, a second electronic device 810 may each be a DPP device, and it is assumed that the first electronic device 800 operates as an enrollee AP and the second electronic device 810 operates as an enrollee client.

In operation 811, the second electronic device 810 as an enrollee client may perform an IEEE 802.11 scanning operation based on the IEEE 802.11 standard. In operation 813, the second electronic device 810 may discover the first electronic device 800 as an enrollee AP during the IEEE 802.11 scanning operation. In operation 815, the second electronic device 810 may transmit a peer discovery request frame including a connector attribute to the discovered first electronic device 800. In operation 817, the first electronic device 800 may receive the peer discovery request frame from the second electronic device 810 and transmit a peer discovery response frame to the second electronic device 810 in response to the peer discovery request frame. In another embodiment, the peer discovery response frame may include a connector attribute and a status attribute, and the status attribute may represent a DPP status attribute.

In operation 819, upon receipt of the peer discovery response frame from the first electronic device 800, the second electronic device 810 may perform an IEEE 802.11 authentication operation based on the IEEE 802.11 standard with the first electronic device 800. In operation 821, the second electronic device 810 may perform an IEEE 802.11 association operation based on the IEEE 802.11 standard with the first electronic device 800. In operation 823, the second electronic device 810 may associate with the first electronic device 800 by using network key, authentication and key management (AKM).

The Open Connectivity Foundation (OCF) is an organization formed for the purpose of developing a common, standardized IoT communication system and platform to secure interoperability among IoT devices. The OCF provides an easy setup protocol, which may provide a set of procedures for joining an IoT device to a Wi-Fi network and registering the IoT device to a cloud service. In OCF Wi-Fi easy setup, an IoT device or an enrollee device that wants to join a Wi-Fi network operates as a soft AP, and a mediator or a configurator connects to the soft AP of the enrollee device through Wi-Fi discovery and transmits Wi-Fi network information to the enrollee device. The enrollee device may connect to an enrollee AP by using the received Wi-Fi network information. While yet another embodiment is described based on the standards of the OCF in the disclosure for ease of description, embodiments of the disclosure may be implemented based on IoT-related standards of an organization other than the OCF.

Upon completion of the Wi-Fi easy setup, the mediator or the configurator may receive authentication information from a cloud to register the IoT device or the enrollee device to the cloud. The mediator or the configurator may obtain an auth code or an access token from an authentication server by using an ID (e.g., device ID, serial number, or the like) of the IoT device or the enrollee device, and then transmit the obtained information to the IoT device or the enrollee device. The IoT device or the enrollee device may register to a cloud server by using server information, the auth code, or the access token information received from the mediator or the configurator and receive an available service through the cloud.

Figure 9A:
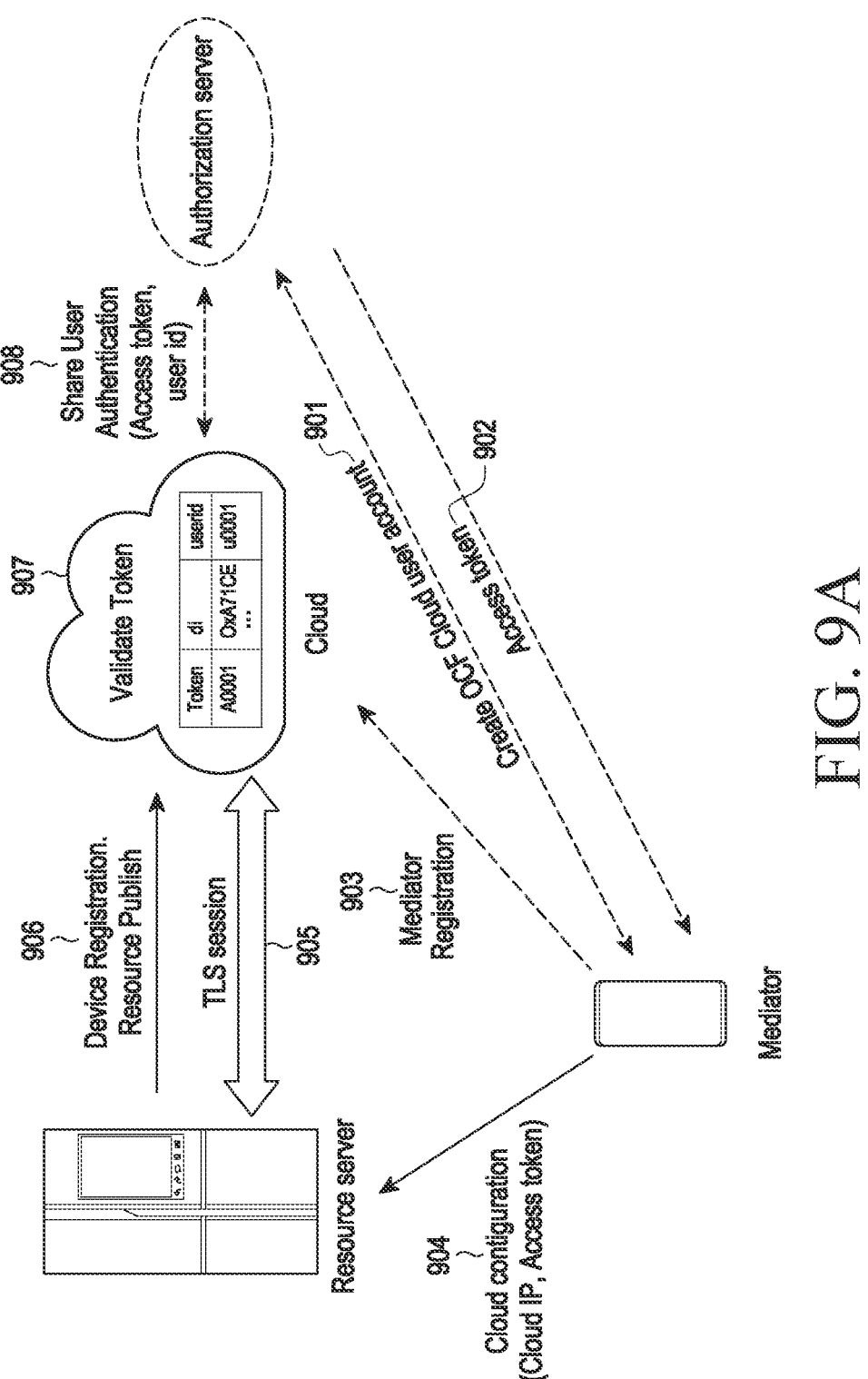
FIG. 9A is a flowchart illustrating an operation of registering to a cloud in an electronic device according to an embodiment of the disclosure.

FIG. 9A is a flowchart illustrating an operation of registering to a cloud in an electronic device according to an embodiment of the disclosure.

Referring to FIG. 9A, in an IoT environment, an electronic device may operate as a mediator and configure an OCF cloud. An authorization server may also be called an authentication server, and a resource server may manage OCF resources.

In operation 901, the mediator may transmit a Create OCF Cloud user account message for creating a user account for the OCF cloud to the authorization server. In operation 902, the mediator may receive an access token for the cloud from the authorization server. The mediator may request mediator registration from the cloud by using the access token received from the authorization server in operation 903, and transmit a message requesting cloud configuration to the resource server in operation 904. The message requesting cloud configuration may include at least one of a cloud ID or the access token.

A transport layer security (TLS) session may be set up between the resource server and the cloud in operation 905, and the resource server may transmit a Device Registration. Resource Publish message requesting device registration and resource publication to the cloud in operation 906. The cloud may validate the access token of the mediator in operation 907, and share user authentication information with the authorization server in operation 908. The user authentication information may include at least one of the access token or a user ID.

The mediator may transmit at least one of cloud server information, an authentication code, or the access token to another electronic device that is an IoT device, and the IoT device may perform device registration to the cloud server and receive available services through the cloud by using the at least one of the cloud server information, the authentication code, or the access token. The mediator may operate as a configurator/initiator as illustrated in FIGS. 3 to 7, and the IoT device may operate as an enrollee/responder as illustrated in FIGS. 3 to 7.

Figure 9B:
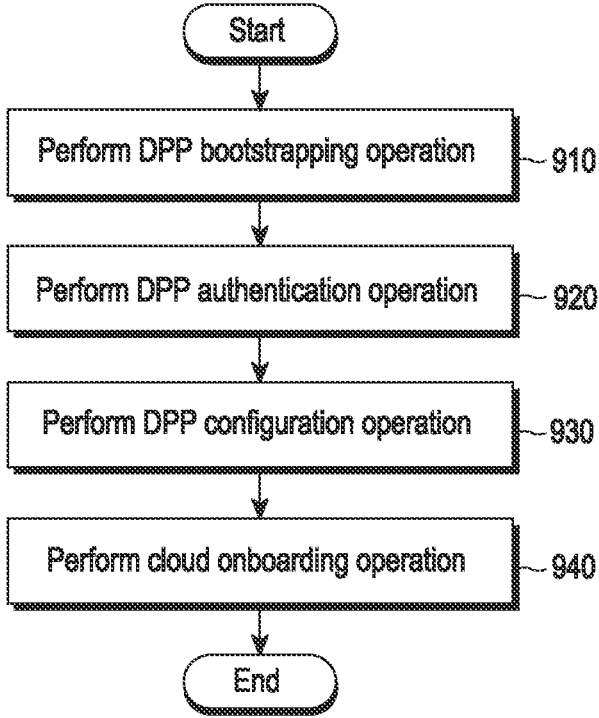
FIG. 9B is a flowchart illustrating an operation of performing a provisioning process and cloud onboarding in a DPP network according to an embodiment of the disclosure.

FIG. 9B is a flowchart illustrating an operation of performing a provisioning process and cloud onboarding in a DPP network according to an embodiment of the disclosure.

Referring to FIG. 9B, in operation 910, an electronic device (e.g., the electronic device 101 of FIG. 1) may perform a DPP bootstrapping operation with an external electronic device (e.g., the electronic device 102 or the electronic device 104 of FIG. 1). In FIG. 9B, it is assumed that the electronic device operates as a configurator and the external electronic device operates as an enrollee. Because the DPP bootstrapping operation performed between a configurator and an enrollee has been described with reference to FIG. 7, a description of the DPP bootstrapping operation performed between the electronic device and the external electronic device will be avoided.

In operation 920, the electronic device may perform a DPP authentication operation with the external electronic device. Because the DPP authentication operation performed between a configurator and an enrollee has been described with reference to FIG. 7, a detailed description of the DPP authentication operation performed between the electronic device and the external electronic device will be avoided.

In operation 930, the electronic device may perform a DPP configuration operation with the external electronic device. In operation 940, the electronic device may perform a cloud onboarding operation. A cloud onboarding operation performed by an enrollee will be described later with reference to FIG. 10.

In another embodiment of the disclosure, the electronic device operating as a configurator may obtain identification information about the external electronic device from the external electronic device, and transmit an authentication information request message including the identification information about the external electronic device to a server. The electronic device may receive, from the server, authentication information required to authenticate the external electronic device, for cloud onboarding. The electronic device may transmit a provisioning configuration response message including the authentication information required to authenticate the external electronic device to the external electronic device.

In yet another embodiment of the disclosure, the electronic device operating as a configurator may transmit a provisioning authentication request message to the external electronic device, for provisioning authentication between the electronic device and the external electronic device. The electronic device may receive a provisioning authentication response message corresponding to the provisioning authentication request message from the external electronic device. The electronic device may receive a provisioning configuration request message for provisioning configuration between the electronic device and the external electronic device from the external electronic device.

In another embodiment of the disclosure, the electronic device operating as an enrollee may provide identification information about the electronic device to the external electronic device. The electronic device may transmit a provisioning configuration request message to the external electronic device, for provisioning configuration between the electronic device and the external electronic device. The electronic device may receive, from the external electronic device, a provisioning configuration response message including authentication information required to authenticate the electronic device, for cloud onboarding. The electronic device operating as an enrollee may receive a provisioning authentication request message from the external electronic device, for provisioning authentication between the electronic device and the external electronic device. The electronic device may transmit a provisioning authentication response message corresponding to the provisioning authentication request message to the external electronic device.

Figure 10:
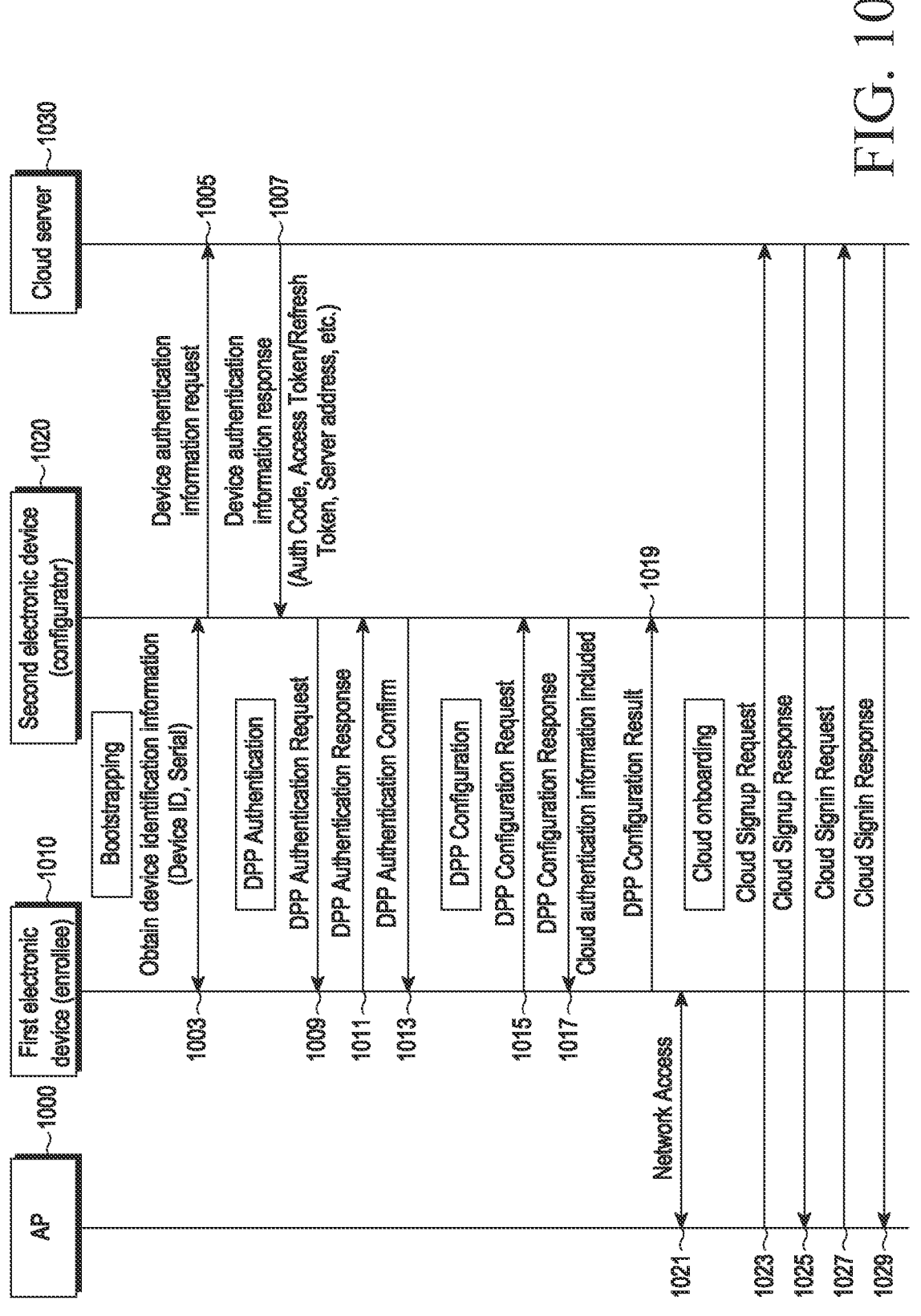
FIG. 10 is a diagram illustrating an operation of simultaneously configuring a provisioning process and cloud onboarding in a DPP network according to an embodiment of the disclosure.

FIG. 10 is a diagram illustrating an operation of simultaneously configuring a provisioning process and cloud onboarding in a DPP network according to an embodiment of the disclosure.

Referring to FIG. 10, each of a first electronic device 1010 and a second electronic device 1020 may be a DPP device, with the first electronic device 1010 operating as an enrollee or a responder and the second electronic device 1020 operating as a configurator or an initiator.

The disclosure proposes an operation of simultaneously configuring a provisioning process and cloud onboarding in a DPP network. The operation of simultaneously configuring a provisioning process and cloud onboarding may be largely divided into 1) bootstrapping (operation 1003 in FIG. 10), 2) DPP authentication (operation 1009 to operation 1013 in FIG. 10), 3) DPP configuration (operation 1015 to operation 1019 in FIG. 10), and 4) cloud onboarding (operation 1023 to operation 1029 in FIG. 10).

In operation 1003, the second electronic device 1020 operating as a configurator or an initiator may obtain identification information (e.g., a device ID or serial information) about the first electronic device 1010 from the first electronic device 1010 operating as an enrollee or a responder, through bootstrapping. Bootstrapping refers to an operation of reading a device identification information field of another electronic device during information exchange between the electronic devices through a QR code, BLE/NFC, or a string/cloud. In another embodiment, an electronic device may exchange its identification information with another electronic device by including the identification information about the electronic device in a Configuration Request frame without using a bootstrapping procedure.

tion about the first electronic device 1010 from the cloud server 1030. The device authentication information about the first electronic device 1010 may include at least one of an authentication code, an access token, a refresh token, or a server address.

In operation 1009, the second electronic device 1020 may transmit a DPP Authentication Request message to the first electronic device 1010. In yet another embodiment, the DPP Authentication Request message may include security information used in the DPP authentication operation, corresponding to at least one of a hash value, a public bootstrapping key of the second electronic device 1020, or a public protocol key of the second electronic device 1020.

In operation 1011, the first electronic device 1010 may transmit a DPP Authentication Response message to the second electronic device 1020. In a further embodiment, the DPP Authentication Response message may include security information used in the DPP authentication operation, including at least one of a DPP status field or a public protocol key of the first electronic device 1010.

In operation 1013, the second electronic device 1020 may transmit a DPP Authentication Confirm message to the first electronic device 1010. The DPP Authentication Confirm message may allow the first electronic device 1010 to identify that the DPP authentication of the first electronic device 1010 has been successfully completed.

In operation 1015, the first electronic device 1010 may transmit a DPP Configuration Request message to the second electronic device 1020. In operation 1017, the second electronic device 1020 may transmit a DPP Configuration Response message to the first electronic device 1010. In still another embodiment, the second electronic device 1020 may add the device authentication information about the first electronic device 1010 received from the cloud server 1030 to a DPP Connector Object in the DPP Configuration Response message, and transmit the DPP Configuration Response message to the first electronic device 1010.

Table 1 is an example of a traditional DPP Connector Object structure, and Table 2 is an example of the DPP Configuration Object added in the DPP Configuration Response message in the disclosure.

TABLE 1

```
{
    "groups":
    [
        {"groupId":"home","netRole":"sta"},
        {"groupId":"cottage","netRole":"sta"}
    ],
    "netAccessKey":
    {
        "kty":"EC",
        "crv":"P-256",
        "x":"xj-zV2iEiH8XwyA9ijpsL6xyLvDiIBthrHO8ZVxwmpA",
        "y":"LUsDBmn7nv-LCnn6fBoxKsKpLGJiVpY_knTckGgsgeU"
    },
    "expiry":"2019-01-31T22:00:00+02:00"
}
```

In operation 1005, the second electronic device 1020, which is already registered to a cloud, may request device authentication information about the first electronic device 1010 from a cloud server 1030 by using the identification information about the first electronic device 1010 obtained in operation 1003. In operation 1007, the second electronic device 1020 may receive a device authentication information response including the device authentication informa-

TABLE 2

```
"cloudInfo":
{
    "sn":"TestSN011", // Device Serial
    "at": "ACCESSTOKEN1", // Access Token
    "rt":"REFRESHTOKEN1", // Refresh Token
    "cis": " " // Cloud Interface Server Address
```

TABLE 2-continued

```
          ...
      }
```

Referring to Table 2, the device authentication information for the cloud, which is added to the DPP Connector Object in the DPP Configuration Response message, may include at least one of device serial information, an access token, a refresh token, or a cloud server address. In an embodiment, referring to Table 3, the device authentication information for the cloud may be JSON Web Signature (JWS)-encoded and included in the DPP Connector Object.

TABLE 3

```
{
    "wi-fi_tech":"infra",
    "discovery":
    {
        "ssid":"mywifi"
    },
    "cred":
    {
        "akm":"dpp",
        "signedConnector":
        "eyJ0eXAiOiJkcHBDb24iLCJraWQiOiJrTWNlZ0RCUG1OWlzha0F
        zQlpPek9vQ3N2UWprc9uRUFwOXVGLUVEbVZFIiwiYWxnIjoiR
        VMyNTYifQ.eyJncm91cHMiolt7Imdyb3VwSWQiOiJob21lIiwibmV
        0Um9sZSI6InN0YSJ9LHsiZ3JvdXBJZCI6ImNvdHRhZ2UiLCJuZX
        RSb2xIjoic3RhIn1dLCJuZXRBY2Nlc3NLZXkiOnsia3R5IjoiRUMiL
        CJjcnYiOiJQLTI1NiIsIngiOiJYai16VjJpRWllOFh3eUE5aWpwc0w2
        eHlMdkRpSUj0aHJITzhaVnh3bxBBIiwieSI6IkxVc0RCbW43bnYtTE
        NubjZmQm9YS3NLcExHSmlWcFlfa25UY2tHZ3NnZVUifSwiZXhw
        aXJ5IjoiMjAxOS0wMS0zMVQyMjowMDowMCswMjowMCJ9.8fJS
        NCpDjv5BEFfmlqEbBNTaHx2L6c_22Uvr9KYjtAw88VfvEUWiruE
        CUSJCUVFqv1yDEE4RJVdTIw3aUDhlMw",
        "csign":
        {
        "kty":"EC",
        "crv":"P-256",
        "x":"MKBCTNIcKUSDii11ySs3526iDZ8AiTo7Tu6KPAqv7D
        4",
        "y":"4Etl6SRW2YiLUrN5vfvVHuhp7x8PxltmWW1bbM4IFyM
        ",
        "kid":"kMcegDBPmNZVakAsBZOzOoCsvQjkr_nEAp9uF-
        EDmVE"
        }
    }
}
```

In operation 1019, the first electronic device 1010 may transmit a DPP Configuration Result message to the second electronic device 1020. The second electronic device 1020 may receive the DPP Configuration Result message and identify that the DPP configuration between the first electronic device 1010 and the second electronic device 1020 has been completed.

In operation 1021, the first electronic device 1010 and an AP 1000 may perform a network access procedure to allow the first electronic device 1010 to connect to a Wi-Fi network. The first electronic device 1010 may be connected to the AP 1000 through DPP network access, and may be in a state where Internet access is available.

The first electronic device 1010 may then sign up to the cloud based on an Oauth scheme by using the device authentication information for the cloud, received from the second electronic device 1020, and a service desired by the first electronic device 1010 may then be provided through the cloud connection. The Oauth scheme refers to an open standard for access delegation used as a common means for Internet users to authorize a website or an application to access their information on another website without providing a password.

In operation 1023, the AP 1000 or the first electronic device 1010 may transmit a Cloud Signup Request message to the cloud server 1030. In operation 1025, the cloud server 1030 may transmit a Cloud Signup Response message to the AP 1000 or the first electronic device 1010 in response to the Cloud Signup Request message.

In operation 1027, the AP 1000 or the first electronic device 1010 may transmit a Cloud Signin Request message to the cloud server 1030. In operation 1029, the cloud server 1030 may transmit a Cloud Signin Response message to the AP 1000 or the first electronic device 1010 in response to the Cloud Signin Request message.

Figure 11:
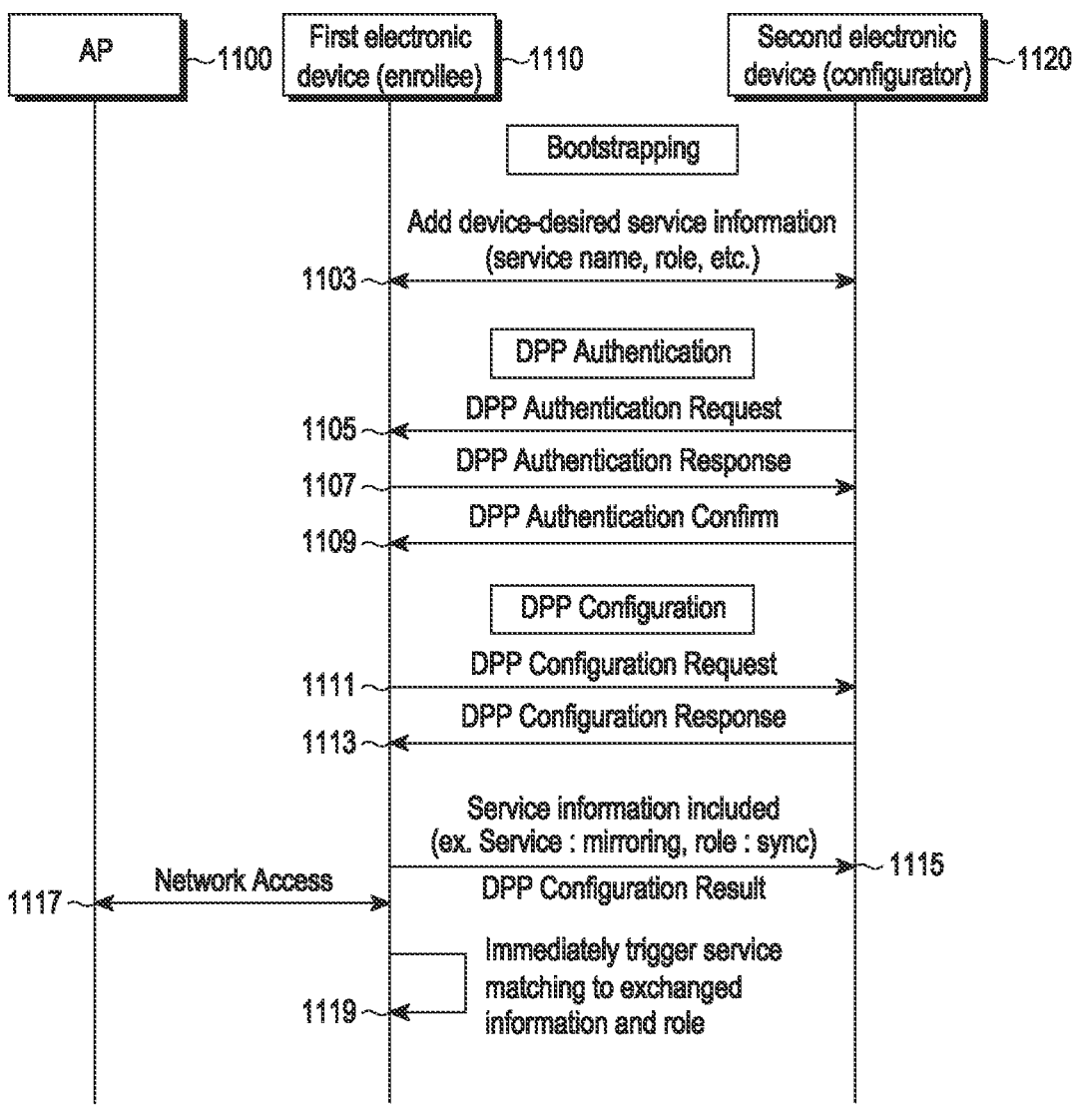
FIG. 11 is a diagram illustrating an operation of using a DPP connector in a service by extending the DPP connector in a DPP network according to an embodiment of the disclosure.

FIG. 11 is a diagram illustrating an operation of using a DPP connector in a service by extending the DPP connector in a DPP network according to an embodiment of the disclosure.

Referring to FIG. 11, each of a first electronic device 1110 and a second electronic device 1120 may be a DPP device, with the first electronic device 1110 operating as an enrollee or a responder and the second electronic device 1120 operating as a configurator or an initiator.

The disclosure proposes a method of allowing the first electronic device 1110 to trigger a desired service immediately after a provisioning process in a DPP network. The operation of triggering a desired service of the first electronic device 1110 immediately after a provisioning process may be largely divided into 1) bootstrapping (operation 1103 in FIG. 11), 2) DPP authentication (operation 1105 to operation 1109 in FIG. 11), 3) DPP configuration (operation 1111 to operation 1115 in FIG. 11), and 4) service trigger (operation 1119 in FIG. 11).

In operation 1103, the second electronic device 1120 serving as a configurator or an initiator may obtain service information (e.g., a service name, a role, and so on) desired by the first electronic device 1110 from the first electronic device 1110 operating as an enrollee or a responder, through bootstrapping. For example, the service information desired by the first electronic device 1110 may be configured in the form of {Service: Mirroring, Role: Sync/Source}. Bootstrapping refers to an operation of reading a device identification information field of another electronic device during information exchange between electronic devices through a QR code, BLE/NFC, or a string/cloud. In another embodiment, an electronic device may transmit, to another electronic device, service information desired by the electronic device in a DPP Configuration Request message without using the bootstrapping procedure.

In operation 1105, the second electronic device 1120 may transmit a DPP Authentication Request message to the first electronic device 1110. In operation 1107, the first electronic device 1110 may transmit a DPP Authentication Response message to the second electronic device 1120. In operation 1109, the second electronic device 1120 may transmit a DPP Authentication Confirm message to the first electronic device 1110. The DPP Authentication Confirm message may allow the first electronic device 1110 to identify that the DPP authentication of the first electronic device 1110 has been successfully completed.

In operation 1111, the first electronic device 1110 may transmit a DPP Configuration Request message to the second electronic device 1120. In operation 1113, the second electronic device 1120 may transmit a DPP Configuration Response message to the first electronic device 1110. In yet another embodiment, the second electronic device 1120 may add information configuring the type and role of a service to be provided by the first electronic device 1110 to a DPP Connector Object in the DPP Configuration Response message based on the service information obtained from the first electronic device 1110, and transmit the DPP Configuration Response message to the first electronic device 1110. When the first electronic device 1110 adds the information configuring the type and role of the service to be provided by the first electronic device 1110 to the DPP Connector Object, the first electronic device 1110 may trigger the service without discovering and requesting the service (e.g., a discovery procedure), after accessing a DPP network.

Referring to Table 4, when the first electronic device 1110 adds the information configuring the type and role of the service to be provided to the DPP Connector Object, a DPP Connector is encoded in a JWS structure, which facilitates extension of additional data.

TABLE 4

```
{
    "groups":
    [
        {"groupId":"home","netRole":"sta"},
        {"groupId":"cottage","netRole":"sta"}
    ],
    "netAccessKey":
    {
        "kty":"EC",
        "crv":"P-256",
        "x":"xj-zV2iEiH8XwyA9ijpsL6xyLvDiIBthrHO82VxwmpA",
        "y":"LUsDBmn7nv-LCnn6fBoxKsKpLGJiVpY_knTckGgsgeU"
    },
    "expiry":"2019-01-31722:00:00+02:00"
    "serviceInfo":
    {
        "name":"mirroring", // service type
        "role":"sync", // service role
        ...
    }
}
```

In operation 1115, the first electronic device 1110 may transmit a DPP Configuration Result message to the second electronic device 1120. The second electronic device 1120 may receive the DPP Configuration Result message and identify that the DPP configuration between the first electronic device 1110 and the second electronic device 1120 has been completed. In a further embodiment, the DPP Configuration Result message may include the service information for the first electronic device 1110. For example, the service information for the first electronic device 1110 may be configured in the form of {Service: Mirroring, Role: Sync}.

In operation 1117, the first electronic device 1110 and the AP 1100 may perform a network access procedure to allow the first electronic device 1110 to connect to the Wi-Fi network. The first electronic device 1110 may be connected to the AP 1100 through DPP network access, and may be in a state where Internet access is available.

In operation 1119, the first electronic device 1110 may trigger a service matching to the information exchanged with the second electronic device 1120 and the role. Traditionally, a discovery process is required to identify what service the first electronic device 1110 wants or supports after connecting to the DPP network. However, in the embodiment of FIG. 11 proposed in the disclosure, the first electronic device 1110 may trigger a desired service immediately after the provisioning process in the DPP network.

Figure 12:
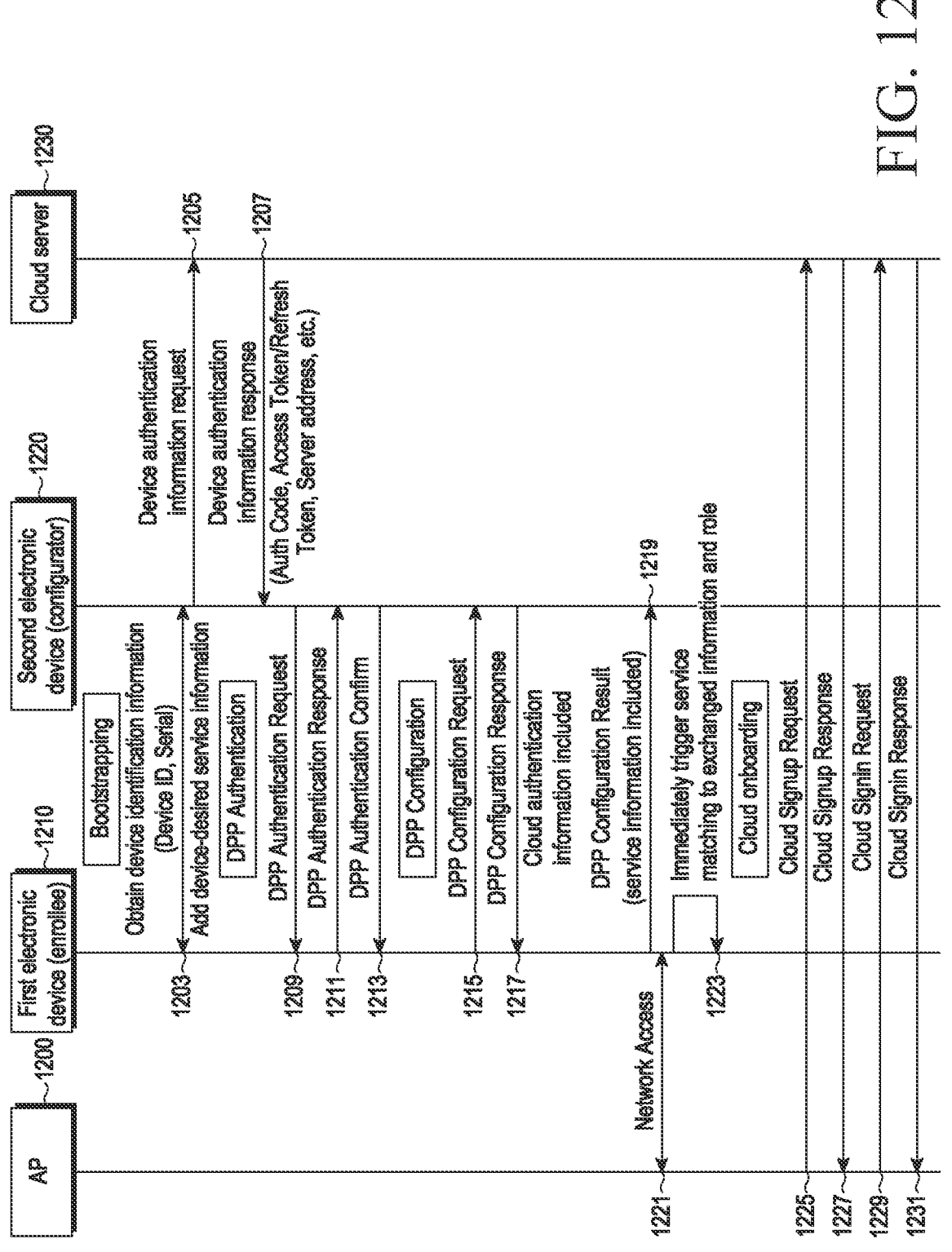
FIG. 12 is a diagram illustrating an operation of using a DPP connector in a service by extending the DPP connector in a DPP network, when a provisioning process and cloud onboarding are simultaneously configured according to an embodiment of the disclosure.

FIG. 12 is a diagram illustrating an operation of using a DPP connector in a service by extending the DPP connection, when a provisioning process and cloud onboarding are simultaneously configured in a DPP network according to an embodiment of the disclosure.

Referring to FIG. 12, each of a first electronic device 1210 and a second electronic device 1220 may be a DPP device, with the first electronic device 1210 operating as an enrollee or a responder and the second electronic device 1220 operating as a configurator or an initiator.

The disclosure proposes an operation of simultaneously configuring a provisioning process and cloud onboarding in a DPP network. The operation of simultaneously configuring a provisioning process and cloud onboarding may be largely divided into 1) bootstrapping (operation 1203 in FIG. 12), 2) DPP authentication (operation 1209 to operation 1213 in FIG. 12), 3) DPP configuration (operation 1215 to operation 1219 in FIG. 12), 4) service trigger (operation 1223 in FIG. 12), and 5) cloud onboarding (operation 1225 to operation 1231 in FIG. 12).

In operation 1203, the second electronic device 1220 may obtain, from the first electronic device 1210, identification information (e.g., a device ID or serial information) about the first electronic device 1210 and service information (e.g., a service name, a role, and so on) desired by the first electronic device 1210, through bootstrapping. In another embodiment, an electronic device may transmit a DPP Configuration Request message including at least one of identification information about the electronic device and service information desired by the electronic device to another electronic device, without using the bootstrapping procedure.

In operation 1205, the second electronic device 1220, which is already registered to the cloud, may request device authentication information about the first electronic device 1210 from a cloud server 1230 by using the identification information about the first electronic device 1210 obtained in operation 1203. In operation 1207, the second electronic device 1220 may receive a device authentication information response including the device authentication information about the first electronic device 1210 from the cloud server 1230. The device authentication information about the first electronic device 1210 may include at least one of an authentication code, an access token, a refresh token, or a server address.

In operation 1209, the second electronic device 1220 may transmit a DPP Authentication Request message to the first electronic device 1210. In operation 1211, the first electronic device 1210 may transmit a DPP Authentication Response message to the second electronic device 1220. In operation 1213, the second electronic device 1220 may transmit a DPP Authentication Confirm message to the first electronic device 1210. The DPP Authentication Confirm message may allow the first electronic device 1210 to identify that the DPP authentication of the first electronic device 1210 has been successfully completed.

In operation 1215, the first electronic device 1210 may transmit a DPP Configuration Request message to the second electronic device 1220. In operation 1217, the second electronic device 1220 may transmit a DPP Configuration Response message to the first electronic device 1210. In yet another embodiment, the second electronic device 1220 may add the device authentication information about the first electronic device 1210 received from the cloud server 1030 to a DPP Connector Object in the DPP Configuration Response message and transmit the DPP Configuration Response message to the first electronic device 1210. In a further embodiment, the second electronic device 1220 may add information configuring the type and role of a service to be provided by the first electronic device 1210 to the DPP Connector Object in the DPP Configuration Response message, based on the service information obtained from the first electronic device 1210, and transmit the DPP Configuration Response message to the first electronic device 1210.

In operation 1219, the first electronic device 1210 may transmit a DPP Configuration Result message to the second electronic device 1220. The second electronic device 1220 may receive the DPP Configuration Result message and identify that the DPP configuration between the first electronic device 1210 and the second electronic device 1220 has been completed. In still another embodiment, the DPP Configuration Result message may include the service information for the first electronic device 1210. For example, the service information for the first electronic device 1210 may be configured in the form of {Service: Mirroring, Role: Sync}.

In operation 1221, the first electronic device 1210 and an AP 1200 may perform a network access procedure to allow the first electronic device 1210 to connect to a Wi-Fi network. The first electronic device 1210 may be connected to the AP 1200 through DPP network access, and may be in a state where Internet access is available. In operation 1223, the first electronic device 1210 may immediately trigger a service matching to the information exchanged with the second electronic device 1220 and the role.

In operation 1225, the AP 1200 or the first electronic device 1210 may transmit a Cloud Signup Request message to the cloud server 1230. In operation 1227, the cloud server 1230 may transmit a Cloud Signup Response message to the AP 1200 or the first electronic device 1210 in response to the Cloud Signup Request message.

In operation 1229, the AP 1200 or the first electronic device 1210 may transmit a Cloud Signin Request message to the cloud server 1230. In operation 1231, the cloud server 1230 may transmit a Cloud Signin Response message to the AP 1200 or the first electronic device 1210 in response to the Cloud Signin Request message.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
memory storing instructions;
a communication circuit; and
at least one processor operably couped to the memory and the communication circuit,
wherein the instructions, when executed by the at least one processor, cause the electronic device to:
obtain, from an external electronic device, identification information about the external electronic device,

transmit, to a server through the communication circuit, an authentication information request message including the identification information about the external electronic device,
receive, from the server through the communication circuit, authentication information required for authenticating the external electronic device to register the external electronic device in a cloud,
receive, from the external electronic device through the communication circuit, a provisioning configuration request message for network configuration, and
transmit, to the external electronic device through the communication circuit, a provisioning configuration response message including the authentication information required for authenticating the external electronic device.

2. The electronic device of claim 1, wherein the instructions, when executed by the at least one processor, cause the electronic device is further to obtain, from the external electronic device, the identification information about the external electronic device in any one of a quick response (QR) code scheme, Bluetooth communication, a Bluetooth low energy scheme, a near field communication scheme, and a public key exchange scheme.

3. The electronic device of claim 1, wherein the identification information required for authenticating the external electronic device includes at least one of an authentication code, an access token, a refresh token, or a server address.

4. The electronic device of claim 1, wherein the instructions, when executed by the at least one processor, cause the electronic device is further to:
transmit, to the external electronic device through the communication circuit, a provisioning authentication request message for provisioning authentication between the electronic device and the external electronic device; and
receive, from the external electronic device through the communication circuit, a provisioning authentication response message corresponding to the provisioning authentication request message.

5. The electronic device of claim 1,
wherein the instructions, when executed by the at least one processor, cause the electronic device further to obtain, from the external electronic device, first service information configured by the external electronic device, and
wherein the provisioning configuration response message is configured to further include second service information configured by the electronic device based on the first service information.

6. The electronic device of claim 1, wherein the identification information about the external electronic device includes at least one of a device identifier (ID) or serial information of the external electronic device.

7. An electronic device comprising:
memory storing instructions;
a communication circuit; and
at least one processor operably couped to the memory and the communication circuit,
wherein the instructions, when executed by the at least one processor, cause the electronic device to:
provide, to an external electronic device, identification information about the electronic device,
transmit, to the external electronic device through the communication circuit, a provisioning configuration request message for provisioning between the electronic device and the external electronic device, for network configuration, and receive, from the external electronic device through the communication circuit, a provisioning configuration response message including authentication information required for authenticating the electronic device to register the electronic device in a cloud.

8. The electronic device of claim 7, wherein the instructions, when executed by the at least one processor, cause the electronic device further to provide, to the external electronic device, the identification information about the electronic device in any one of a quick response (QR) code scheme, Bluetooth communication, a Bluetooth low energy scheme, a near field communication scheme, and a public key exchange scheme.

9. The electronic device of claim 7, wherein the identification information required for authenticating the electronic device includes at least one of an authentication code, an access token, a refresh token, or a server address.

10. The electronic device of claim 7, wherein the instructions, when executed by the at least one processor, cause the electronic device further to:

receive, from the external electronic device through the communication circuit, a provisioning authentication request message for provisioning authentication between the electronic device and the external electronic device; and transmit, to the external electronic device through the communication circuit, a provisioning authentication response message corresponding to the provisioning authentication request message.

11. The electronic device of claim 7, wherein the instructions, when executed by the at least one processor, cause the electronic device further to provide, to the external electronic device, first service information configured by the electronic device, and wherein the provisioning configuration response message is configured to further include second service information configured by the external electronic device based on the first service information.

12. The electronic device of claim 7, wherein the identification information about the electronic device includes at least one of a device identifier (ID) or serial information of the electronic device.

13. A method performed by an electronic device, the method comprising:

obtaining, from an external electronic device, identification information about the external electronic device;

transmitting, to a server, an authentication information request message including the identification information about the external electronic device;

receiving, from the server, authentication information required for authenticating the external electronic device to register the external electronic device in a cloud;

receiving, from the external electronic device, a provisioning configuration request message for provisioning configuration between the electronic device and the external electronic device; and transmitting, to the external electronic device, a provisioning configuration response message including the authentication information required for authenticating the external electronic device.

14. The method of claim 13, wherein the identification information about the external electronic device is obtained in any one of a quick response (QR) code scheme, Bluetooth communication, a Bluetooth low energy scheme, a near field communication scheme, and a public key exchange scheme.

15. A method performed by an electronic device, the method comprising:

providing, to an external electronic device, identification information about the electronic device;

transmitting, to the external electronic device, a provisioning configuration request message for provisioning between the electronic device and the external electronic device, for network configuration; and receiving, from the external electronic device, a provisioning configuration response message including authentication information required for authenticating the electronic device to register the electronic device in a cloud.

* * * * *